United States Patent
Hu et al.

(10) Patent No.: US 12,160,867 B2
(45) Date of Patent: Dec. 3, 2024

(54) TRANSPORT BLOCK SCHEDULING METHOD AND DEVICE, STORAGE MEDIUM AND ELECTRONIC DEVICE

(71) Applicant: ZTE Corporation, Shenzhen (CN)

(72) Inventors: Youjun Hu, Shenzhen (CN); Bo Dai, Shenzhen (CN); Huiying Fang, Shenzhen (CN); Weiwei Yang, Shenzhen (CN); Kun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 848 days.

(21) Appl. No.: 17/266,873

(22) PCT Filed: Aug. 10, 2019

(86) PCT No.: PCT/CN2019/100102
§ 371 (c)(1),
(2) Date: Feb. 8, 2021

(87) PCT Pub. No.: WO2020/030157
PCT Pub. Date: Feb. 13, 2020

(65) Prior Publication Data
US 2021/0298057 A1 Sep. 23, 2021

(30) Foreign Application Priority Data
Aug. 10, 2018 (CN) .......................... 201810914054.7

(51) Int. Cl.
*H04L 5/00* (2006.01)
*H04W 72/23* (2023.01)

(52) U.S. Cl.
CPC ................................. *H04W 72/23* (2023.01)

(58) Field of Classification Search
CPC .... H04W 72/23; H04L 1/1896; H04L 5/0091; H04L 5/0092; H04L 5/0053
See application file for complete search history.

(56) References Cited

U.S. PATENT DOCUMENTS 11,190,300 B2 * 11/2021 Hwang ................. H04L 1/0009
2011/0019776 A1 1/2011 Zhang et al.
(Continued)

FOREIGN PATENT DOCUMENTS

CN 102265695 A 11/2011
CN 103973403 A 8/2013
(Continued)

OTHER PUBLICATIONS

International Search Report for corresponding application PCT/CN2019/100102 filed Aug. 10, 2019; Mail date Nov. 1, 2019.
(Continued)

*Primary Examiner* — Lan-Huong Truong
(74) *Attorney, Agent, or Firm* — CANTOR COLBURN LLP

(57) ABSTRACT

Provided are a transport block (TB) scheduling method and device, a storage medium and an electronic device. The method includes: in the case that one DCI schedules multiple TBs, the sizes of the multiple TBs are indicated through a resource assignment field, an MCS field, offset value indicator information and NDI information of the DCI, wherein the NDI information is used for determining whether the multiple TBs are newly transmitted or retransmitted; or the sizes of the multiple TBs are indicated through the resource assignment field, the MCS field, and the offset value indicator information of the DCI; and the DCI is transmitted over a PDCCH.

18 Claims, 3 Drawing Sheets

(56) References Cited

U.S. PATENT DOCUMENTS

| | | | |
|---|---|---|---|
| 2011/0075684 A1 | 3/2011 | Zeng et al. | |
| 2011/0239072 A1 | 9/2011 | Cai | |
| 2011/0300854 A1 | 12/2011 | Shan | |
| 2019/0053211 A1* | 2/2019 | Ying | ............... H04W 72/044 |
| 2019/0229843 A1* | 7/2019 | Yoshimoto | ............ H04L 5/0055 |

FOREIGN PATENT DOCUMENTS

| | | | | |
|---|---|---|---|---|
| CN | 106685587 A | 5/2017 | | |
| EP | 3417558 B1 * | 7/2021 | ........... | H04L 1/1812 |
| KR | 1020110108289 A | 10/2011 | | |
| WO | 2012099516 A1 | 7/2012 | | |
| WO | 2018064583 A1 | 4/2018 | | |

OTHER PUBLICATIONS

European Search Report for corresponding application EP19847085; Report dated Sep. 17, 2021.

* cited by examiner

TRANSPORT BLOCK SCHEDULING METHOD AND DEVICE, STORAGE MEDIUM AND ELECTRONIC DEVICE

CROSS-REFERENCE TO RELATED APPLICATIONS

The present disclosure claims priority to Chinese Patent Application No. 201810914054.7 filed to the China National Intellectual Property Administration on Aug. 10, 2018, the disclosure of which is hereby incorporated by reference in its entirety.

TECHNICAL FIELD

The present disclosure relates to the field of communication, in particular to a transport block (TB) scheduling method and device, a storage medium and an electronic device.

BACKGROUND

Compared with the condition of using one physical downlink control channel (PDCCH for short) for scheduling one transport block (TB for short), using one PDCCH for multi-TB scheduling may reduce the control signaling overhead and improve the transmission efficiency. During multi-TB scheduling, a corresponding process index, new transmission, retransmission and non-transmission indicators need to be embodied in the design of downlink control information (DCI for short). At the same time, during the sub-package of the upper layer, multi-TB scheduling may result in different transport block sizes (TBS) due to limited transmission resources and uncertain packet sizes. Overhead is increased when TBs of different sizes are indicated in one DCI. How to reduce the overhead to the minimum and guarantee multi-TB resource scheduling and process scheduling is a problem faced by using one DCI for scheduling multiple TBs of different sizes.

A solution has not provided yet for solving the problem of how to reduce the overhead and guarantee multi-TB resource scheduling and process scheduling when TBs of different sizes are indicated in one DCI in the prior art.

SUMMARY

The embodiments of the present disclosure provide a TB scheduling method and device, a storage medium and an electronic device, for solving the problem of how to reduce the overhead and guarantee multi-TB resource scheduling and process scheduling when the TBs of different sizes are indicated in one DCI in the prior art.

According to one embodiment of the present disclosure, provided is a TB scheduling method, including:

in the case that one downlink control information (DCI) schedules multiple TBs, sizes of the multiple TBs are indicated through a resource assignment field, a Modulation and Coding Scheme (MCS) field, offset value indicator information and new data indicator (NDI) information of the DCI, the NDI information being used for determining whether the multiple TBs are newly transmitted or retransmitted; or, the sizes of the multiple TBs are indicated through the resource assignment field, the MCS field, and the offset value indicator information of the DCI; and the DCI is transmitted over a physical downlink control channel (PDCCH).

According to another aspect of the embodiment of the present disclosure, further provided is a transport block (TB) scheduling method, including: a determination module, configured to determine, in the case that one downlink control information (DCI) schedules multiple TBs, sizes of the multiple TBs through a resource assignment field, an MCS field, offset value indicator information and new data indicator (NDI) information of the DCI, the NDI information being used for determining whether the multiple TBs are newly transmitted or retransmitted; or determine the sizes of the multiple TBs through the resource assignment field, the MCS field, and the offset value indicator information of the DCI; and a transport module, configured to transmit the DCI over a physical downlink control channel (PDCCH).

According to yet another embodiment of the present disclosure, further provided is a storage medium, a computer program is stored in the storage medium, and the computer program is configured to run to execute the method of the above mentioned embodiment.

According to yet another embodiment of the present disclosure, further provided is an electronic device including a memory and a processor, wherein the memory has a computer program stored therein, and the processor is configured to run the computer program to execute the method of the above mentioned embodiment.

According to the present disclosure, when the sizes of the multiple TBs are different, the sizes of the multiple TBs are determined through the resource assignment field, the MCS field, the offset value indicator information and the NDI information of the downlink control information (DCI), or, the sizes of the multiple TBs are determined through the resource assignment field, the MCS field, and the offset value indicator information of the DCI, such that the problem of how to reduce the overhead and guarantee multi-TB resource scheduling and process scheduling when the TBs of different sizes are indicated in one DCI in the prior art is solved, and the effects that when the TBS are different, the multiple TBs are scheduled through one DCI and the overhead is low are achieved.

BRIEF DESCRIPTION OF THE DRAWINGS

The accompanying drawings described herein serve to provide a further understanding of the present disclosure and form a part hereof, and the illustrative embodiments of the present disclosure and the description of the illustrative embodiments serve to explain the present disclosure and are not to be construed as unduly limiting the present disclosure. In the drawings.

DETAILED DESCRIPTION OF THE EMBODIMENTS

The present disclosure will be described in detail below with reference to the accompanying drawings in conjunction with embodiments. It should be noted that the embodiments of the present application and the features of the embodiments may be combined with each other without conflict.

It should be noted that the terms "first", "second" and so forth, in the description and claims of the present disclosure and in the above-mentioned drawings, are used to distinguish between similar objects and not necessarily to describe a particular order or sequential order.

Embodiment 1

Figure 1:
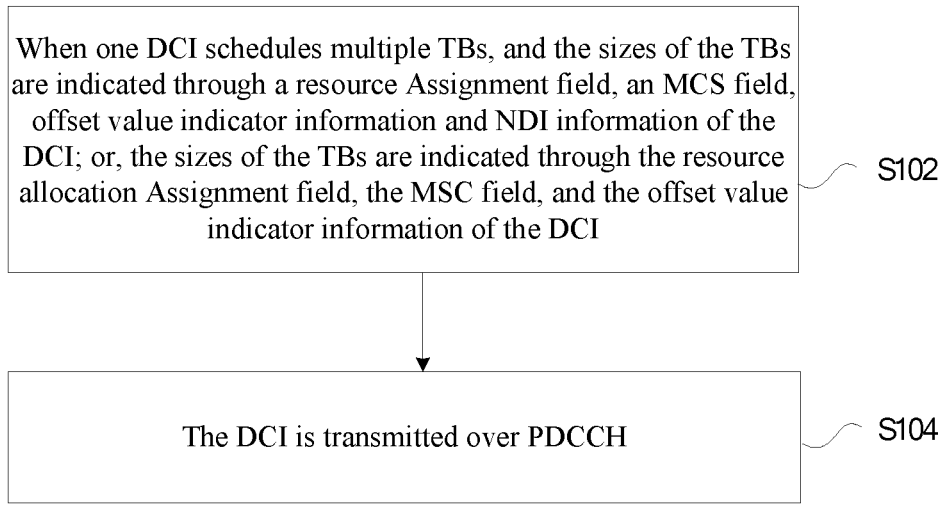
FIG. 1 is a flowchart of a multi-TB scheduling method according to an embodiment of the present disclosure.

In this embodiment, FIG. 1 is a flowchart of a multi-TB scheduling method according to an embodiment of the present disclosure, and as shown in FIG. 1, the flow includes the following steps:

S102, in the case that one downlink control information (DCI) schedules multiple TBs, the sizes of the multiple TBs are determined through a resource assignment field, an MCS field, offset value indicator information and new data indicator (NDI) information of the DCI, the NDI information being used for determining whether the multiple TBs are newly transmitted or retransmitted; or the sizes of the multiple TBs are determined through the resource assignment field, the MCS field, and the offset value indicator information of the DCI; and S104, the DCI is transmitted over PDCCH.

According to the above steps, in the case that the sizes of the multiple TBs are different, the sizes of the multiple TBs are determined through the resource assignment field, the MCS field, the offset value indicator information and the NDI information of the downlink control information (DCI), or, the sizes of the multiple TBs are determined through the resource assignment field, the MCS field, and the offset value indicator information of the DCI, such that the problem of how to reduce the overhead and guarantee multi-TB resource scheduling and process scheduling when the TBs of different sizes are indicated in one DCI in the prior art is solved, and the effects that when the TBS are different, the multiple TBs are scheduled through one DCI and the overhead is low are achieved.

In some embodiments, the execution body of the steps mentioned above may be a base station, etc., but is not limited thereto.

In some embodiments, a value of the offset value indicator information is determined according to at least one of the resource assignment field, the MCS field, and the NDI information.

In some embodiments, determining sizes of the multiple TBs through a resource assignment field, an MCS field, offset value indicator information and NDI information of the DCI; or, determining sizes of the multiple TBs through the resource assignment field, the modulation coding domain, and the offset value indicator information of the DCI includes:

under the conditions that one DCI schedules two TBs, indicator values $I_{TBS}$ of MCS fields of the two TBs are identical and NDI information of the two TBs is identical, an index $I_{SF}$ of the resource allocation amount in a resource assignment field of the second TB is indicated through a 3-bit offset value indicator information; or, $I_{SF}$ in a resource assignment field of the second TB is indicated through a 1-bit or 2-bit offset value indicator information, wherein indicator 2=indicator 1+transverse position offset β; or, $I_{SF}$ in a resource assignment field of the second TB is indicated through a 1-bit offset value indicator information, wherein indicator 2=an integer from rounding [indicator 1*transverse position offset β];

wherein the indicator 1 is the number of resources indicated by a resource number indicator domain in the DCI, and indicator 2 is the actual number of newly transmitted resources, or indicator 2 is the actual number of retransmitted resources.

In some embodiments, determining the sizes of the multiple TBs through a resource assignment field, an MCS field, offset value indicator information and NDI information of the DCI; or, determining sizes of the multiple TBs through the resource assignment field, the modulation coding domain, and the offset value indicator information of the DCI includes:

in the case that one DCI schedules two TBs and the NDI information corresponding to the two TBs is different, when indexes $I_{SF}$ of the resource allocation amount in resource assignment fields of the two TBs are identical, an indicator value $I_{TBS}$ of an MCS field of the second TB is indicated through a 4-bit offset value indicator information, or, when $I_{SF}$ and $I_{TBS}$ of the two TBs are different, the transverse position offset β and longitudinal position offset α corresponding to the $I_{SF}$ and $I_{TBS}$ of the second TB are indicated through a 3-bit offset value indicator information, wherein $[I_{SF2}\ I_{TBS2}]=[I_{SF1}\ I_{TBS1}]+[\beta\alpha]$, or, the transverse position offset β and longitudinal position offset α corresponding to the $I_{SF}$ and $I_{TBS}$ of the second TB are indicated through a 2-bit offset value indicator information, wherein $[I_{SF2}\ I_{TBS2}]$=an integer from rounding $[I_{SF1}*\beta\ I_{TBS1}*\alpha]$;

wherein $[I_{SF2}\ I_{TBS2}]$ represents a resource assignment field indicator value and an MCS field indicator value of indicator 2, and $[I_{SF1}\ I_{TBS1}]$ represents a resource assignment field indicator value and an MCS field indicator value of indicator 1;

the indicator 1 is a TBS indicated by $I_{SF}$ and $I_{TBS}$ in the DCI, indicator 2 is a TBS of a newly transmitted TB, or indicator 2 is a TBS of a retransmitted TB.

In some embodiments, determining the sizes of the multiple TBs through a resource assignment field, an MCS field, offset value indicator information and NDI information of the DCI includes:

$I_{SF}$ and $I_{TBS}$ corresponding to indicator 2 are determined according to an index $I_{SF}$ of the resource allocation amount or an indicator value $I_{TBS}$ of the MCS field of indicator 1;

The indicator 1 is a TBS indicated by $I_{SF}$ and $I_{TBS}$ in the DCI, indicator 2 is a TBS of a newly transmitted TB, or indicator 2 is a TBS of a retransmitted TB.

In some embodiments, determining $I_{SF}$ and $I_{TBS}$ corresponding to indicator 2 according to $I_{SF}$ or $I_{TBS}$ of indicator 1 includes:

In a case that one DCI schedules two TBs, the indicator values $I_{TBS}$ of the MCS fields of the two TBs are identical, and the two TBs are both newly transmitted or retransmitted, indicator 2=indicator 1+transverse position offset β;
or indicator 2=an integer from rounding [indicator 1*transverse position offset β], wherein β is determined according to $I_{SF}$ and $I_{TBS}$ of indicator 1, or according to $I_{TBS}$ of indicator 1 and the resource allocation amount $N_{SF}$.

In some embodiments, determining $I_{SF}$ and $I_{TBS}$ corresponding to indicator 2 according to $I_{SF}$ or $I_{TBS}$ of indicator 1 includes:

in the case that one DCI schedules two TBs and the NDI information corresponding to the two TBs is different, $[I_{SF2}I_{TBS2}]=[I_{SF1}I_{TBS1}]+[\beta\alpha]$, or, $[I_{SF2}I_{TBS2}]$=an integer from rounding $[I_{SF1}*\beta I_{TBS1}\alpha*]$, Wherein β is a transverse offset, α is a longitudinal offset, α and β are determined according to $I_{SF}$ and $I_{TBS}$ of indicator 1, or $I_{TBS}$ and the resource allocation amount $N_{SF}$;

wherein $[I_{SF2} I_{TBS2}]$ represents a resource assignment field indicator value and an MCS field indicator value of indicator 2, and $[I_{SF1} I_{TBS1}]$ represents a resource assignment field indicator value and an MCS field indicator value of indicator 1.

In some embodiments, the determining the sizes of the multiple TBs through a resource assignment field, an MCS field, and NDI information of one downlink control information (DCI) includes:

in the case that the DCI schedules N TBs, the N TBs are classified into a first type of TBs and a second type of TBs, N being an even number larger than 2; classification information of the N TBs is indicated through k bits, a value range of k being $$[1, \text{ceil}(\log_2^{N/2+1})];$$

and
in the case that indicator values $I_{TBS}$ of MCS fields of the N TBs are identical and the first type of TBs and the second type of TBs are both newly transmitted or retransmitted, an index $I_{SF}$ of the resource allocation amount in a resource assignment field of the second type of TBs is indicated through a 3-bit offset value indicator information; or, $I_{SF}$ in a resource assignment field of the second type of TBs is indicated through a 1-bit or 2-bit offset value indicator information, wherein indicator 2=indicator 1+transverse position offset β; or, $I_{SF}$ in a resource assignment field of the second type of TBs is indicated through a 1-bit offset value indicator information, wherein indicator 2=an integer from rounding [indicator 1*transverse position offset β];

the indicator 1 is a TBS of the first type of TBs indicated by the $I_{SF}$ and $I_{TBS}$ in the resource assignment field of the DCI, and indicator 2 is a TBS of the second type of TBs indicated by the $I_{SF}$ and IBS in the resource assignment field of the DCI.

In some embodiments, determining the sizes of the multiple TBs through a resource assignment field, an MCS field, offset value indicator information and NDI information of the DCI; or, determining sizes of the multiple TBs through the resource assignment field, the modulation coding domain, and the offset value indicator information of the DCI includes:

in the case that the DCI schedules N TBs, the N TBs are classified into a first type of TBs and a second type of TBs, N being an even number larger than 2; classification information of the N TBs is indicated through one of 1 to $$\text{ceil}(\log_2^{N/2+1})$$

bit offset value indicator information; and
in the case that the N TBs are transmitted in a manner of hybrid new transmission and retransmission, when indexes $I_{SF}$ of the resource allocation amount of the first type of TBs and the second type of TBs are identical, an indicator value $I_{TBS}$s of an MCS field of the second type of TBs is indicated through a 4-bit offset value indicator information; and when $I_{SF}$ and $I_{TBS}$ of the first type of TBs and the second type of TBs are different, the corresponding offset parameters, that is, transverse position offset β and longitudinal position offset α, of the $I_{SF}$ and $I_{TBS}$ of the second type of TBs are indicated through a 3-bit offset value indicator information, wherein $[I_{SF2} I_{TBS2}]=[I_{SF1} I_{TBS1}]+[\beta\ \alpha]$; or, the corresponding offset parameters, that is, transverse position offset β and longitudinal position offset α, of the $I_{SF}$ and $I_{TBS}$ of the second type of TBs are indicated through a 2-bit offset value indicator information, wherein $[I_{SF2} I_{TBS2}]$=an integer from rounding $[I_{SF1}*\beta I_{TBS1}*\alpha]$;

wherein $[I_{SF2} I_{TBS2}]$ represents a resource assignment field indicator value and an MCS field indicator value of indicator 2, and $[I_{SF1} I_{TBS1}]$ represents a resource assignment field indicator value and an MCS field indicator value of indicator 1;

the indicator 1 is a TBS of the first type of TBs indicated by the $I_{SF}$ and $I_{TBS}$ in the resource assignment field of the DCI, and indicator 2 is a TBS of the second type of TBs indicated by the $I_{SF}$ and $I_{TBS}$ in the resource assignment field of the DCI.

In some embodiments, determining the sizes of the multiple TBs through a resource assignment field, an MCS field, offset value indicator information and NDI information of the DCI includes:

in the case that the DCI schedules N TBs, the N TBs are classified into a first type of TBs and a second type of TBs, N being an even number larger than 2; classification information of the N TBs is indicated through one of 1 to $$\text{ceil}(\log_2^{N/2+1})$$

bit offset value indicator information; and $I_{SF}$ and ITS corresponding to indicator 2 are determined according to an index $I_{SF}$ of the resource allocation amount in the resource assignment field or an indicator value $I_{TBS}$ of the MCS field of indicator 1;

the indicator 1 is a TBS of the first type of TBs indicated by the $I_{SF}$ and $I_{TBS}$ in the resource assignment field of the DCI, and indicator 2 is a TBS of the second type of TBs indicated by the $I_{SF}$ and IBS in the resource assignment field of the DCI.

In some embodiments, determining $I_{SF}$ and $I_{TBS}$ corresponding to indicator 2 according to $I_{SF}$ or $I_{TBS}$ of indicator 1 includes:

under the conditions that the DCI schedules the N TBs, $I_{TBS}$ of the first type of TBs and the second type of TBs are identical and the first type of TBs and the second type of TBs are both newly transmitted or retransmitted, indicator 2=indicator 1+transverse position offset β;
or indicator 2=an integer from rounding [indicator 1*transverse position offset β], wherein β is determined according to $I_{SF}$ and $I_{TBS}$ of indicator 1, or according to $I_{TBS}$ and the resource allocation amount $N_{SF}$ of indicator 1.

In some embodiments, determining $I_{SF}$ and $I_{TBS}$ corresponding to indicator 2 according to $I_{SF}$ or $I_{TBS}$ of indicator 1 includes:

in the case that the DCI schedules the N TBs and the first type of TBs and the second type of TBs are transmitted in a manner of hybrid new transmission and retransmission, $[I_{SF2}I_{TBS2}]=[I_{SF1}I_{TBS1}]+[\beta\alpha]$, or, $[I_{SF2}I_{TBS2}]$=an integer from rounding $[I_{SF1}*\beta I_{TBS1}*\alpha]$, wherein α and β are determined according to $I_{SF}$ and $I_{TBS}$ of indicator 1, or according to $I_{TBS}$ and the resource allocation amount $N_{SF}$ Of indicator 1;

wherein $[I_{SF2} I_{TBS2}]$ represents a resource assignment field indicator value and an MCS field indicator value of indicator 2, and $[I_{SF1} I_{TBS1}]$ represents a resource assignment field indicator value and an MCS field indicator value of indicator 1.

The embodiment of the present disclosure provides a design completing the DCI with relatively low overhead when one PDCCH schedules multiple TBs with possibly different sizes, which improves transmission efficiency. When the TBS is different, resource scheduling information of different TBs needs to be indicated. When the multiple TBs are scheduled, overlarge overhead is directly and separately indicated, and through a method of classifying the multiple TBs, small-range offset on each type or direct TBS binding on the multiple types may guarantee that the signaling overhead is reduced as much as possible under the condition of scheduling multiple types of different TBs, which includes:

1) Multi-TB scheduling requires that scheduling information of each TB is indicated in the DCI when the TBS is different. Used methods mainly include a signaling indicator and an implicit indicator. The signaling indicator needs bit overhead, and the implicit indicator is carried out on the signaling indicator of other TBs according to an existing indicator without using the signaling overhead.

2) During 2-TB scheduling, assuming that channel conditions may be considered to be identical, modulation encoding modes are consistent and kept identical, which is mainly used for scenes where the two TBs are both newly transmitted or retransmitted. The resource assignment field needs to be designed, and signaling indicator methods include:

Method 1: a resource allocation value of the second TB is represented directly by second resource allocation amount a to find corresponding TBS. α has 8 states in total and needs 3-bit overhead.

Method 2: indicator 2=indicator 1+position offset β (RU index)

It is set that $I_{SF}2=I_{SF}-\beta$, that is, a resource allocation value of indicator 2. Transverse left-right offset is possible without constraints, and principles indicated during offset include:

An non-offset state must be included, that is, both TBS are identical.

The indication is achieved with a smaller overhead bit.

Mode a: an example of a 2-bit overhead offset is given when the offset may be in both transverse left and right directions as follows:

| β | Offset |
|---|---|
| 00 | 0 |
| 01 | 1 |
| 10 | −1 |
| 11 | 2 |

Mode b: when it is assumed that the resource allocation amount of indicator 2 is less than that of the indicated, the offset is unidirectional, and when 1 bit is used for saving the overhead, there are the following examples:

| β | Offset |
|---|---|
| 0 | 0 |
| 1 | 1 | or

| β | Offset |
|---|---|
| 0 | 0 |
| 1 | 2 | or

| β | Offset |
|---|---|
| 0 | 0 |
| 1 | 3 |

Method 3: indicator 2=an integer from rounding [indicator 1*offset coefficient β] Rounding $[I_{SF}*\beta]$ obtains the resource allocation value of indicator 2. An indicator method of 1-bit overhead is exemplified as follows:

| β | Offset |
|---|---|
| 0 | 0 |
| 1 | ½ | or

| β | Offset |
|---|---|
| 0 | 0 |
| 1 | ⅓ |

β may use more bits and more states, and may also define more different offset values.

3) During 2-TB scheduling, under the scene of hybrid new transmission and retransmission, target block error ratios (BLER) may not be consistent, $I_{TBS}$ may be different, and RU may also be different. The principle of the signaling indication method is as follows:

An non-offset state must be included, that is, both TBS are identical. The indication is implemented with a smaller overhead bit.

The methods are mainly as follows:

Method 1: when assuming that scheduling of the resource allocation amount $I_{SF}$ is consistent, $I_{TBS}$ is indicated with 4 bits. The indicator may be directly performed.

Method 2: when the resource allocation amount $I_{SF}$ and the MCS field $I_{TBS}$ are different, it may use:

indicator 2=indicator 1+transverse position offset β+longitudinal position offset α.

The transverse position offset refers to an offset of RU index or an offset allocated by RU. The longitudinal position offset refers to an offset to $I_{TBS}$. In the case that indicator 1 represents a retransmitted TB signaling indicator and indicator 2 is a newly transmitted signaling indicator, the following table is exemplified:

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1128 | 1256 | 1544 | 2024 | 2536 |

Indicator 2 is ($I_{TBS}$+α, $I_{SF}$+β), wherein α and β may be valued as the following table:

| α | β | |
|---|---|---|
| | 0 | 1 |
| 0 | 00 (000) | 01 (001) |
| 1 | 10 (010) | 11 (011) |

| α | β | |
|---|---|---|
| | 0 | 1 |
| 2 | 20 (100) | 21 (101) |
| 3 | 30 (110) | 31 (111) | or:

| α | β | |
|---|---|---|
| | 0 | 1 |
| 0 | 00 (000) | 01 (001) |
| 2 | 10 (010) | 11 (011) |
| 4 | 20 (100) | 21 (101) |
| 6 | 30 (110) | 31 (111) |

The indicator needs 3 bits, and single-direction offset may be carried out transversely and longitudinally. Indicator 1 may also represent a newly transmitted TB indicator, and then an offset direction of indicator 2 is opposite the direction described above.

Method 3: indicator 2=an integer from rounding [indicator 1*transverse offset coefficient β]+an integer from rounding [indicator 1*longitudinal offset coefficient α]. An example using 2-bit overhead is as follows:

| β | Transverse offset coefficient |
|---|---|
| 0 | 0 |
| 1 | ½ |

| α | Longitudinal offset coefficient |
|---|---|
| 0 | 0 |
| 1 | ⅓ |

4) During 2-TB scheduling, the implicit indicator method has the advantage of not needing extra overhead, and main principles of which include:

$I_{TBS}$ and $I_{SF}$ corresponding to indicator 2 are determined according to $I_{TBS}$ or $I_{SF}$ of indicator 1.

Determined forms mainly include coefficients offset values.

5) assuming that the channel conditions may be considered to be identical, the modulation encoding modes are consistent, and $I_{TBS}$ are kept identical by default, which is mainly used for scenes where the two TBs are both newly transmitted or retransmitted. The resource assignment field needs to be designed, and according to the principles in 4), methods mainly include:

Method 1: indicator 2=indicator 1+position offset β (RU index). It is noted that β is obtained from $I_{TBS}$ and $I_{SF}$ (or $N_{SF}$) of indicator 1, one β corresponding to each $I_{TBS}$ or $I_{SF}$ value of indicator 1. An example of obtaining position offset β from $I_{TBS}$ is as follows (assuming that there is a fixed magnitude relationship of the resource allocation amount between indicator 2 and indicator 1).

| $I_{TBS}$ | \multicolumn{8}{c}{$I_{SF}/N_{SF}$} | Position offset β |
|---|---|---|---|---|---|---|---|---|---|
|  | 0 | 1 | 2 | 3 | 4 | 5 | 6 | 7 |  |
| 0 | 1 | 2 | 3 | 4 | 5 | 6 | 8 | 10 | 0 |
| 1 | 1 | 2 | 3 | 4 | 5 | 6 | 8 | 10 | 0 |
| 2 | 1 | 2 | 3 | 4 | 5 | 6 | 8 | 10 | 0 |
| 3 | 1 | 1 | 2 | 3 | 4 | 5 | 6 | 8 | 1 |
| 4 | 1 | 2 | 3 | 4 | 4 | 5 | 6 | 8 | 1 |
| 5 | 1 | 2 | 3 | 4 | 4 | 5 | 6 | 8 | 1 |
| 6 | 1 | 1 | 1 | 2 | 3 | 4 | 5 | 6 | 2 |
| 7 | 1 | 1 | 1 | 2 | 3 | 4 | 5 | 6 | 2 |
| 8 | 1 | 1 | 1 | 2 | 3 | 4 | 5 | 6 | 2 |
| 9 | 1 | 1 | 1 | 2 | 3 | 4 | 5 | 6 | 2 |
| 10 | 1 | 1 | 1 | 1 | 2 | 3 | 4 | 5 | 3 |
| 11 | 1 | 1 | 1 | 1 | 2 | 3 | 4 | 5 | 3 |
| 12 | 1 | 1 | 1 | 1 | 2 | 3 | 4 | 5 | 3 |
| 13 | 1 | 1 | 1 | 1 | 2 | 3 | 4 | 5 | 3 |

Method 2: indicator 2=an integer from rounding [indicator 1*offset coefficient β] It is noted that β is obtained from the $I_{SF}$ (or $N_{SF}$) and $I_{TBS}$ of indicator 1, one β corresponding to each $I_{TBS}$ or $I_{SF}$ value of indicator 1. An example of obtaining offset coefficient β from $I_{TBS}$ is as follows (assuming that there is a fixed magnitude relationship of the resource allocation amount between indicator 2 and indicator 1).

| $I_{TBS}$ | \multicolumn{8}{c}{$I_{SF}/N_{SF}$} | Offset coefficient β |
|---|---|---|---|---|---|---|---|---|---|
|  | 0 | 1 | 2 | 3 | 4 | 5 | 6 | 7 |  |
| 0 | 1 | 2 | 3 | 4 | 5 | 6 | 8 | 10 | 1 |
| 1 | 1 | 2 | 3 | 4 | 5 | 6 | 8 | 10 | 1 |
| 2 | 1 | 2 | 3 | 4 | 5 | 6 | 8 | 10 | 1 |
| 3 | 1 | 2 | 3 | 4 | 4 | 5 | 6 | 8 | 3/4 |
| 4 | 1 | 2 | 3 | 4 | 4 | 5 | 6 | 8 | 3/4 |
| 5 | 1 | 2 | 3 | 4 | 4 | 5 | 6 | 8 | 3/4 |
| 6 | 1 | 2 | 3 | 4 | 4 | 5 | 6 | 8 | 3/4 |
| 7 | 1 | 2 | 3 | 4 | 4 | 5 | 6 | 8 | 3/4 |
| 8 | 1 | 2 | 3 | 4 | 4 | 5 | 6 | 8 | 3/4 |
| 9 | 1 | 2 | 2 | 3 | 3 | 4 | 4 | 5 | 1/2 |
| 10 | 1 | 2 | 2 | 3 | 3 | 4 | 4 | 5 | 1/2 |
| 11 | 1 | 2 | 2 | 3 | 3 | 4 | 4 | 5 | 1/2 |
| 12 | 1 | 2 | 2 | 3 | 3 | 4 | 4 | 5 | 1/2 |
| 13 | 1 | 2 | 2 | 3 | 3 | 4 | 4 | 5 | 1/2 |

6) During 2-TB scheduling, under the scene of hybrid new transmission and retransmission, the target BLER may not be consistent, $I_{TBS}$ may be different, and RU may also be different. A principle of the implicit indicator method is consistent with 4), and assuming that indicator 2 has a fixed magnitude relationship with indicator 1 in the resource allocation amount and the modulation encoding amount, the indicator method is as follows:

Method 1: indicator 2=indicator 1+transverse position offset β+longitudinal position offset α It is noted that β and α are obtained from the $I_{SF}$ (or $N_{SF}$) and $I_{TBS}$ of indicator 1, one set of β and α values only corresponding to each $I_{TBS}$ or $I_{SF}$ value of indicator 1. One example of which is as follows:

| \multicolumn{8}{c}{Indicator 2 (β, α)} | \multicolumn{9}{c}{Indicator 1 $I_{SF}$} |
|---|---|---|---|---|---|---|---|---|---|---|---|---|---|---|---|---|
| 0 | 1 | 2 | 3 | 4 | 5 | 6 | 7 | $I_{TBS}$ | 0 | 1 | 2 | 3 | 4 | 5 | 6 | 7 |
| (3, 3) | (3, 3) | (3, 3) | (2, 3) | (2, 3) | (1, 3) | (1, 3) | (0, 3) | 0 | 16 | 32 | 56 | 88 | 120 | 152 | 208 | 256 |
| (3, 3) | (3, 3) | (3, 3) | (2, 3) | (2, 3) | (1, 3) | (1, 3) | (0, 3) | 1 | 24 | 56 | 88 | 144 | 176 | 208 | 256 | 344 |
| (3, 3) | (3, 3) | (3, 3) | (2, 3) | (2, 3) | (1, 3) | (1, 3) | (0, 3) | 2 | 32 | 72 | 144 | 176 | 208 | 256 | 328 | 424 |
| (3, 3) | (3, 3) | (3, 3) | (2, 3) | (2, 3) | (1, 3) | (1, 3) | (0, 3) | 3 | 40 | 104 | 176 | 208 | 256 | 328 | 440 | 568 |
| (3, 2) | (3, 2) | (3, 2) | (2, 2) | (2, 2) | (1, 2) | (1, 2) | (0, 2) | 4 | 56 | 120 | 208 | 256 | 328 | 408 | 552 | 680 |
| (3, 2) | (3, 2) | (3, 2) | (2, 2) | (2, 2) | (1, 2) | (1, 2) | (0, 2) | 5 | 72 | 144 | 224 | 328 | 424 | 504 | 680 | 872 |
| (3, 2) | (3, 2) | (3, 2) | (2, 2) | (2, 2) | (1, 2) | (1, 2) | (0, 2) | 6 | 88 | 176 | 256 | 392 | 504 | 600 | 808 | 1032 |
| (3, 2) | (3, 2) | (3, 2) | (2, 2) | (2, 2) | (1, 2) | (1, 2) | (0, 2) | 7 | 104 | 224 | 328 | 472 | 584 | 680 | 968 | 1224 |
| (3, 1) | (3, 1) | (3, 1) | (2, 1) | (2, 1) | (1, 1) | (1, 1) | (0, 1) | 8 | 120 | 256 | 392 | 536 | 680 | 808 | 1096 | 1352 |
| (3, 1) | (3, 1) | (3, 1) | (2, 1) | (2, 1) | (1, 1) | (1, 1) | (0, 1) | 9 | 136 | 296 | 456 | 616 | 776 | 936 | 1256 | 1544 |
| (3, 1) | (3, 1) | (3, 1) | (2, 1) | (2, 1) | (1, 1) | (1, 1) | (0, 1) | 10 | 144 | 328 | 504 | 680 | 872 | 1032 | 1384 | 1736 |
| (3, 1) | (3, 1) | (3, 1) | (2, 1) | (2, 1) | (1, 1) | (1, 1) | (0, 1) | 11 | 176 | 376 | 584 | 776 | 1000 | 1192 | 1608 | 2024 |
| (3, 0) | (3, 0) | (3, 0) | (2, 0) | (2, 0) | (1, 0) | (1, 0) | (0, 0) | 12 | 208 | 440 | 680 | 904 | 1128 | 1352 | 1800 | 2280 |
| (3, 0) | (3, 0) | (3, 0) | (2, 0) | (2, 0) | (1, 0) | (1, 0) | (0, 0) | 13 | 224 | 488 | 744 | 1128 | 1256 | 1544 | 2024 | 2536 |

The β and α values are optional. Indicator 2 in the table represents that a code rate is greater than or equal to a code rate of indicator 1, and the number of RU is greater than or equal to the number of indicated RU.

Method 2: indicator 2=an integer from rounding [indicator 1*transverse offset coefficient β]+an integer from rounding [indicator 1*longitudinal offset coefficient α]. It is noted that offset coefficients β and α are obtained from the $I_{SF}$ (or $N_{SF}$) and $I_{TBS}$ of indicator 1, one set of β and α values only corresponding to each $I_{TBS}$ or $I_{SF}$ value of indicator 1. Examples are similar to Method 1, β and α are taken from the coefficients instead of the offset.

7) When multi-process scheduling exists and scheduling of multiple TBs is supported, at the moment, the multiple TBs need to be classified, all TBs in one type are identical in size, and DCI indicators are consistent. At the moment, 1) All TBs are in one type and then may be indicated in a unified manner.
2) The multiple TBs are classified into two types, and a classification indicator needs to be additionally added at the moment.
1. Classification of the multiple TBs may be indicated with 1 bit-2 bits when 4-TB scheduling is supported. There are mainly three solutions for classification as follows:
   Solution 1-1: 2+2, that is, 4 TBs are classified into two types, each type having 2 TBs.
   Solution 1-2: 1+3, that is, 4 TBs are classified into two types, one type having 1 TB and the other type having 3 TBs.
   Solution 1-3: no classification, that is, only one type exists.
   Solution 1-1+Solution 1-3 may be selected when 1 bit is used. When the overhead uses 2 bits, the three solutions may all be indicated.
2. Classification of the multiple TBs may be indicated with 1-3 bits when 8-TB scheduling is supported. There are mainly five solutions for classification as follows:
   Solution 2-1: 4+4, that is, 8 TBs are classified into two types, each type having 4 TBs.
   Solution 2-2: 3+5, that is, a first type has 3 TBs, and a second type has 5 TBs.
   Solution 2-3: 2+6, that is, a first type has 2 TBs, and a second type has 6 TBs.
   Solution 2-4: 1+7, that is, a first type has 1 TBs, and a second type has 7 TBs.
   Solution 2-5: no classification, that is, 8 TBS are identical.
   Solutions 2-5 and 2-1 may be selected when 1 bit is used, solutions 2-1, 2-2, 2-3 and 2-5 are used when 2 bits are used, and all solutions are used when 3 bits are used.
3. 1 to N/2+1 solutions may be used for describing the classification of the N (N is an even number) TBs when N-TB scheduling is supported, a needed overhead range is 1 to log 2 (N/2+1), and the solutions are mainly as follows:
   Solution 3-1: N/2+N/2, that is, each type has 4 TBs.
   Solution 3-2: (N/2−1)+(N/2+1)
   Solution 3-m: (N/2−m+1)+(N+m−1)
   Solution 3-N/2: 1+(N−1)
   Solution 3-N/2+1: no classification.
   Averaging and non-classification solutions may be selected when 1 bit is used. Other solutions are added on the basis of the averaging solution and the non-classification solution when 2 bits or more are used, making the difference between the numbers of the two types of TBs small as much as possible. It is agreed that the previous type of TBs is indicated by indicator 1, and the second type of TBs is indicated by indicator 2.
3) the TBs are classified into multiple types, and TBs of different types are indicated by using a method of classification+class-based offset.
Embodiments of the present disclosure are described in detail below by way of specific examples.

Example 1

The embodiment is mainly used for completing DCI content design under low overhead in different scenes of TBS during multi-TB scheduling enhancement. It mainly elaborates a method that assuming that the channel conditions are identical, the MCS fields $I_{TBS}$ in the DCI are identical and the sampling signaling performs direct indicator in a scene of two newly transmitted or retransmitted TBs, 2-TB scheduling is achieved by using one DCI and a method for multi-TB scheduling is provided.

Situations where sizes of the multiple TBs are different may also occur during multi-TB scheduling. The embodiment mainly describes an indicator method of two newly transmitted or retransmitted TBs or an indicator method of two types of newly transmitted or retransmitted TBs (each type of newly transmitted TBS is identical, and the DCI configuration is consistent). Obviously, the DCI configuration directly indicating 2 TBs is too high in overhead, and some information may be reused. When 2 TBs are indicated to be transmitted by one DCI, the channel conditions may be considered to be identical, the modulation encoding modes are consistent, and $I_{TBS}$ may be kept identical and reused. The scheduling method for directly indicating with signaling is given as follows:

Method 1: a resource allocation value of the second TB is represented directly by second resource allocation amount to find corresponding TBS. α has 8 states in total and needs 3-bit overhead.

Method 2: indicator 2=indicator 1+position offset β (RU index)

It is set that $I_{SF}2=I_{SF}-\beta$, wherein $I_{SF2}$ is a resource allocation value of indicator 2.

When the offset direction is not fixed, there are examples as follows:

| β | Offset |
|---|---|
| 00 | 0 |
| 01 | 1 |
| 10 | −1 |
| 11 | 2 |

The number of the states is four, and 2 bits are needed to a maximum degree for indicator.

When the offset direction is unidirectional there are examples as follows:

| β | Offset |
|---|---|
| 0 | 0 |
| 1 | 1 |
| 0 | 0 |
| 1 | 2 |
| 0 | 0 |
| 1 | 3 |

When 2-bit overhead is used:

| β | Offset |
|---|---|
| 00 | 0 |
| 01 | 1 |
| 10 | 2 |
| 11 | 3 |
| 00 | 0 |
| 01 | 2 |
| 10 | 4 |
| 00 | 0 |
| 01 | Floor (RU index/4) |
| 10 | Floor (RU index/4) * 2 |
| 11 | Floor (RU index/4) * 3 |

Different value ranges correspond to different offset interval values; and in an actual high-layer subpackage rule, when the difference between TBS is large, TBS is made to be equal in a padding mode, or TBS is directly consistent or almost identical during subpackage. Therefore, in the case that the method is improved, the indicator may be achieved only with 2 bits or 1 bit. There is method 3 as follows (Imcs, NRU)

Method 3: indicator 2=an integer from rounding [indicator 1*offset coefficient β]

Assuming that the TB in indicator 1 is larger at this time, and the TB in indicator 2 is smaller, $I_{TBS}$ is identical, and $I_{SF}$ is offset unidirectionally, that is, $I_{SF}$ is reduced. An offset mode is rounded up (or down) on the basis of $I_{SF}$ of indicator 1 multiplied by the offset, from actual conditions, when the offset is large, the coefficient may be ½ or ⅓ or other values.

| β | Offset |
|---|---|
| 0 | 0 |
| 1 | ½ |
| 0 | 0 |
| 1 | ⅓ |

In this embodiment, three methods for describing resource allocation and modulation encoding indicator during 2-TB new transmission are given. While multi-TB scheduling is achieved, the indicator method is simplified by using the sub-package rule, and the resource transmission efficiency is improved.

Example 2

The embodiment is mainly used for completing DCI content design under low overhead in different scenes of TBS during multi-TB scheduling enhancement. It mainly elaborates a method that the signaling performs direct indicator in a scene of one newly transmitted and one retransmitted TBs, 2-TB scheduling is achieved by using one DCI and a method for multi-TB scheduling is provided.

During multi-TB scheduling, a scene of hybrid transmission of a newly transmitted TB and a retransmitted TB, which is set as TB1 and TB2, may occur, and retransmitted TB, that is, TB2 and the corresponding newly transmitted TB, that is, TB1 may or may not be identical in size. The target BLER of the TB2 and the target BLER of the TB1 are inconsistent when the TB2 and the TB1 are identical or different. Two methods are proposed here to address this situation, and a basic solution comparison is as follows:

Basic method 1: an $I_{TBS}$ domain and an $I_{SF}$ domain are directly used for indicating the newly transmitted TB and the retransmitted TB. 7 bit (4+3) needs to be added. The overhead is large.

The principle of the signaling indication method is as follows:

An non-offset state must be included, that is, both TBS are identical; and the indication is implemented with a smaller overhead bit.

The methods are mainly as follows:

Method 1: when assuming that scheduling of the resource allocation amount is consistent, $I_{TBS}$ is indicated, and 4 bits are needed. The indicator may be directly performed.

Method 2: when the resource allocation amount and the MCS field are both different, it may use:

indicator 2=indicator 1+transverse position offset β+longitudinal position offset α.

The transverse position offset refers to an offset of RU index or an offset allocated by RU. The longitudinal position offset refers to an offset to $I_{TBS}$. In the case that indicator 1 represents a retransmitted TB signaling indicator and indicator 2 is a newly transmitted signaling indicator, the following table is exemplified:

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1128 | 1256 | 1544 | 2024 | 2536 |

The indicator 2 is ($I_{TBS}+\alpha$, $I_{SF}+\beta$), wherein α and β may be valued as the following table:

| | β | |
|---|---|---|
| α | 0 | 1 |
| 0 | 00 (000) | 01 (001) |
| 1 | 10 (010) | 11 (011) |
| 2 | 20 (100) | 21 (101) |
| 3 | 30 (110) | 31 (111) | or:

| | β | |
|---|---|---|
| α | 0 | 2 |
| 0 | 00 (000) | 01 (001) |
| 2 | 10 (010) | 11 (011) |
| 4 | 20 (100) | 21 (101) |
| 6 | 30 (110) | 31 (111) |

The indicator needs 3 bits, and single-direction offset may be carried out transversely and longitudinally. Indicator 1 may also represent a newly transmitted TB indicator, and then an offset direction of indicator 2 is opposite the direction described above.

Method 3: indicator 2=an integer from rounding [indicator 1*transverse offset coefficient β]+an integer from rounding [indicator 1*longitudinal offset coefficient α]. An example using 2-bit overhead is as follows:

| β | Transverse offset coefficient |
|---|---|
| 0 | 0 |
| 1 | ½ |

| α | Longitudinal offset coefficient |
|---|---|
| 0 | 0 |
| 1 | ⅓ |

In method 1, indicator 2 may be directly indicated by directly using signaling with a limiting condition that the resource assignment field needs to be kept identical, and 4 bits are needed. Method 2 is to perform search indicator on the indicator 2 on the basis of retransmitted indicator 1. Compared with method 1, the method has the advantages that the resource assignment field may be changed with a limiting condition that search may only be in a limited range. The larger the needed resource overhead is, the more accurate the result is.

In this embodiment, two methods for describing how to indicate DCI resource allocation and modulation encoding during multi-TB transmission of new transmission and retransmission are given. The signaling overhead is effectively saved through different limiting modes and a DCI scheduling solution during hybrid new transmission and retransmission under different TBS is achieved.

Example 3

The embodiment is mainly used for completing DCI content design under low overhead in different scenes of TBS during multi-TB scheduling enhancement. It mainly elaborates a method using an implicit indicator in a scene of two newly transmitted or two retransmitted TBs, 2-TB scheduling is achieved by using one DCI and a method for multi-TB scheduling is provided.

During 2-TB scheduling, the implicit indicator method has the advantage of not needing extra overhead, and main principles of which include:

$I_{TBS}$ and $I_{SF}$ corresponding to indicator 2 are determined according to $I_{TBS}$ or $I_{SF}$ of indicator 1.

Determined forms mainly include coefficients offset values.

Corresponding to the condition of embodiment 1, assuming that the channel conditions may be considered to be identical, the modulation encoding modes are consistent, and $I_{TBS}$ are kept identical by default, which is mainly used for scenes where the two TBs are both newly transmitted or retransmitted. The resource assignment field needs to be designed, and according to main principles of the implicit indicator, the method mainly includes:

Method 1: indicator 2=indicator 1+position offset β (RU index). It is noted that β is obtained from $I_{TBS}$ and $I_{SF}$ (or $N_{SF}$) of indicator 1, one β corresponding to each $I_{TBS}$ or $I_{SF}$ value of indicator 1. An example of obtaining position offset β from $I_{TBS}$ is as follows (assuming that there is a fixed magnitude relationship of the resource allocation amount between indicator 2 and indicator 1).

|       | $I_{SF}/N_{SF}$ |   |   |   |   |   |   |   | position |
|-------|---|---|---|---|---|---|---|---|----------|
| $I_{TBS}$ | 0 | 1 | 2 | 3 | 4 | 5 | 6 | 7 | offset β |
| 0  | 1 | 2 | 3 | 4 | 5 | 6 | 8 | 10 | 0 |
| 1  | 1 | 2 | 3 | 4 | 5 | 6 | 8 | 10 | 0 |
| 2  | 1 | 2 | 3 | 4 | 5 | 6 | 8 | 10 | 0 |
| 3  | 1 | 1 | 2 | 3 | 4 | 5 | 6 | 8 | 1 |
| 4  | 1 | 2 | 3 | 4 | 4 | 5 | 6 | 8 | 1 |
| 5  | 1 | 2 | 3 | 4 | 4 | 5 | 6 | 8 | 1 |
| 6  | 1 | 1 | 1 | 2 | 3 | 4 | 5 | 6 | 2 |
| 7  | 1 | 1 | 1 | 2 | 3 | 4 | 5 | 6 | 2 |
| 8  | 1 | 1 | 1 | 2 | 3 | 4 | 5 | 6 | 2 |
| 9  | 1 | 1 | 1 | 2 | 3 | 4 | 5 | 6 | 2 |
| 10 | 1 | 1 | 1 | 1 | 2 | 3 | 4 | 5 | 3 |
| 11 | 1 | 1 | 1 | 1 | 2 | 3 | 4 | 5 | 3 |
| 12 | 1 | 1 | 1 | 1 | 2 | 3 | 4 | 5 | 3 |
| 13 | 1 | 1 | 1 | 1 | 2 | 3 | 4 | 5 | 3 |

Method 2: indicator 2=an integer from rounding [indicator 1*offset coefficient β] It is noted that β is obtained from the $I_{SF}$ (or $N_{SF}$) and $I_{TBS}$ of indicator 1, one β corresponding to each $I_{TBS}$ or $I_{SF}$ value of indicator 1. An example of obtaining offset coefficient β from $I_{TBS}$ is as follows (assuming that there is a fixed magnitude relationship between the resource allocation amount of indicator 2 and indicator 1).

|       | $I_{SF}/N_{SF}$ |   |   |   |   |   |   |   | Offset |
|-------|---|---|---|---|---|---|---|---|--------|
| $I_{TBS}$ | 0 | 1 | 2 | 3 | 4 | 5 | 6 | 7 | coefficient β |
| 0  | 1 | 2 | 3 | 4 | 5 | 6 | 8 | 10 | 1 |
| 1  | 1 | 2 | 3 | 4 | 5 | 6 | 8 | 10 | 1 |
| 2  | 1 | 2 | 3 | 4 | 5 | 6 | 8 | 10 | 1 |
| 3  | 1 | 2 | 3 | 4 | 4 | 5 | 6 | 8 | 3/4 |
| 4  | 1 | 2 | 3 | 4 | 4 | 5 | 6 | 8 | 3/4 |
| 5  | 1 | 2 | 3 | 4 | 4 | 5 | 6 | 8 | 3/4 |
| 6  | 1 | 2 | 3 | 4 | 4 | 5 | 6 | 8 | 3/4 |
| 7  | 1 | 2 | 3 | 4 | 4 | 5 | 6 | 8 | 3/4 |
| 8  | 1 | 2 | 3 | 4 | 4 | 5 | 6 | 8 | 3/4 |
| 9  | 1 | 2 | 2 | 3 | 3 | 4 | 4 | 5 | 1/2 |
| 10 | 1 | 2 | 2 | 3 | 3 | 4 | 4 | 5 | 1/2 |
| 11 | 1 | 2 | 2 | 3 | 3 | 4 | 4 | 5 | 1/2 |
| 12 | 1 | 2 | 2 | 3 | 3 | 4 | 4 | 5 | 1/2 |
| 13 | 1 | 2 | 2 | 3 | 3 | 4 | 4 | 5 | 1/2 |

The implicit indicator method has large limitation on the value of indicator 2 which may only correspond to indicator 1 one to one. But no extra overhead is need. Meanwhile, the 3 value is optional according to the content in indicator 1.

Example 4

The embodiment is mainly used for completing DCI content design under low overhead in different scenes of TBS during multi-TB scheduling enhancement. It mainly elaborates a method using an implicit indicator in a scene of one newly transmitted and one retransmitted TBs, 2-TB scheduling is achieved by using one DCI and a method for multi-TB scheduling is provided.

During 2-TB scheduling, under the scene of hybrid new transmission and retransmission, the target BLER may not be consistent, $I_{TBS}$ may be different, and RU may also be different. A principle of the implicit indicator method is consistent with embodiment 3, and assuming that indicator 2 has a fixed magnitude relationship with indicator 1 in the resource allocation amount and the modulation encoding amount, the indicator method is as follows:

Method 1: indicator 2=indicator 1+transverse position offset β+longitudinal position offset α It is noted that β and α are obtained from the $I_{SF}$ (or $N_{SF}$) and $I_{TBS}$ of indicator 1, one set of β and α values only corresponding to each $I_{TBS}$ or $I_{SF}$ value of indicator 1. One example of which is as follows:

| indicator 2 | | | | | | | | | indicator 1 | | | | | | | |
| --- | --- | --- | --- | --- | --- | --- | --- | --- | --- | --- | --- | --- | --- | --- | --- | --- |
| (β, α) | | | | | | | | | $I_{SF}$ | | | | | | | |
| 0 | 1 | 2 | 3 | 4 | 5 | 6 | 7 | $I_{TBS}$ | 0 | 1 | 2 | 3 | 4 | 5 | 6 | 7 |
| (3, 3) | (3, 3) | (3, 3) | (2, 3) | (2, 3) | (1, 3) | (1, 3) | (0, 3) | 0 | 16 | 32 | 56 | 88 | 120 | 152 | 208 | 256 |
| (3, 3) | (3, 3) | (3, 3) | (2, 3) | (2, 3) | (1, 3) | (1, 3) | (0, 3) | 1 | 24 | 56 | 88 | 144 | 176 | 208 | 256 | 344 |
| (3, 3) | (3, 3) | (3, 3) | (2, 3) | (2, 3) | (1, 3) | (1, 3) | (0, 3) | 2 | 32 | 72 | 144 | 176 | 208 | 256 | 328 | 424 |
| (3, 3) | (3, 3) | (3, 3) | (2, 3) | (2, 3) | (1, 3) | (1, 3) | (0, 3) | 3 | 40 | 104 | 176 | 208 | 256 | 328 | 440 | 568 |
| (3, 2) | (3, 2) | (3, 2) | (2, 2) | (2, 2) | (1, 2) | (1, 2) | (0, 2) | 4 | 56 | 120 | 208 | 256 | 328 | 408 | 552 | 680 |
| (3, 2) | (3, 2) | (3, 2) | (2, 2) | (2, 2) | (1, 2) | (1, 2) | (0, 2) | 5 | 72 | 144 | 224 | 328 | 424 | 504 | 680 | 872 |
| (3, 2) | (3, 2) | (3, 2) | (2, 2) | (2, 2) | (1, 2) | (1, 2) | (0, 2) | 6 | 88 | 176 | 256 | 392 | 504 | 600 | 808 | 1032 |
| (3, 2) | (3, 2) | (3, 2) | (2, 2) | (2, 2) | (1, 2) | (1, 2) | (0, 2) | 7 | 104 | 224 | 328 | 472 | 584 | 680 | 968 | 1224 |
| (3, 1) | (3, 1) | (3, 1) | (2, 1) | (2, 1) | (1, 1) | (1, 1) | (0, 1) | 8 | 120 | 256 | 392 | 536 | 680 | 808 | 1096 | 1352 |
| (3, 1) | (3, 1) | (3, 1) | (2, 1) | (2, 1) | (1, 1) | (1, 1) | (0, 1) | 9 | 136 | 296 | 456 | 616 | 776 | 936 | 1256 | 1544 |
| (3, 1) | (3, 1) | (3, 1) | (2, 1) | (2, 1) | (1, 1) | (1, 1) | (0, 1) | 10 | 144 | 328 | 504 | 680 | 872 | 1032 | 1384 | 1736 |
| (3, 1) | (3, 1) | (3, 1) | (2, 1) | (2, 1) | (1, 1) | (1, 1) | (0, 1) | 11 | 176 | 376 | 584 | 776 | 1000 | 1192 | 1608 | 2024 |
| (3, 0) | (3, 0) | (3, 0) | (2, 0) | (2, 0) | (1, 0) | (1, 0) | (0, 0) | 12 | 208 | 440 | 680 | 904 | 1128 | 1352 | 1800 | 2280 |
| (3, 0) | (3, 0) | (3, 0) | (2, 0) | (2, 0) | (1, 0) | (1, 0) | (0, 0) | 13 | 224 | 488 | 744 | 1128 | 1256 | 1544 | 2024 | 2536 |

The values of β and α are optional. Indicator 2 in the table of method 1 represents that a code rate is greater than or equal to a code rate of indicator 1, and the number of RU is greater than or equal to the number of indicated RU.

Method 2: indicator 2=an integer from rounding [indicator 1*transverse offset coefficient β]+an integer from rounding [indicator 1*longitudinal offset coefficient α]. It is noted that offset coefficients β and α are obtained from the $I_{SF}$ (or $N_{SF}$) and $I_{TBS}$ of indicator 1, one set of β and α values only corresponding to each $I_{TBS}$ or $I_{SF}$ value of indicator 1. Examples are similar to Method 1, β and α are taken from the coefficients instead of the offset. One example of which is as follows:

| indicator 2 | | | | | | | | | indicator 1 | | | | | | | |
| --- | --- | --- | --- | --- | --- | --- | --- | --- | --- | --- | --- | --- | --- | --- | --- | --- |
| (β, α) | | | | | | | | | $I_{SF}$ | | | | | | | |
| 0 | 1 | 2 | 3 | 4 | 5 | 6 | 7 | $I_{TBS}$ | 0 | 1 | 2 | 3 | 4 | 5 | 6 | 7 |
| (1, 1) | (1, 1) | (1, 1) | (3/4, 1) | (3/4, 1) | (3/4, 1) | (1/2, 1) | (1/2, 1) | 0 | 16 | 32 | 56 | 88 | 120 | 152 | 208 | 256 |
| (1, 1) | (1, 1) | (1, 1) | (3/4, 1) | (3/4, 1) | (3/4, 1) | (1/2, 1) | (1/2, 1) | 1 | 24 | 56 | 88 | 144 | 176 | 208 | 256 | 344 |
| (1, 1) | (1, 1) | (1, 1) | (3/4, 1) | (3/4, 1) | (3/4, 1) | (1/2, 1) | (1/2, 1) | 2 | 32 | 72 | 144 | 176 | 208 | 256 | 328 | 424 |
| (1, 1) | (1, 1) | (1, 1) | (3/4, 1) | (3/4, 1) | (3/4, 3/4) | (1/2, 3/4) | (1/2, 3/4) | 3 | 40 | 104 | 176 | 208 | 256 | 328 | 440 | 568 |
| (1, 1) | (1, 1) | (1, 1) | (3/4, 1) | (3/4, 1) | (3/4, 3/4) | (1/2, 3/4) | (1/2, 3/4) | 4 | 56 | 120 | 208 | 256 | 328 | 408 | 552 | 680 |
| (1, 1) | (1, 1) | (1, 1) | (3/4, 1) | (3/4, 1) | (3/4, 3/4) | (1/2, 3/4) | (1/2, 3/4) | 5 | 72 | 144 | 224 | 328 | 424 | 504 | 680 | 872 |
| (1, 1) | (1, 1) | (1, 3/4) | (3/4, 3/4) | (3/4, 3/4) | (3/4, 1/2) | (1/2, 1/2) | (1/2, 1/2) | 6 | 88 | 176 | 256 | 392 | 504 | 600 | 808 | 1032 |
| (1, 1) | (1, 1) | (1, 3/4) | (3/4, 3/4) | (3/4, 3/4) | (3/4, 1/2) | (1/2, 1/2) | (1/2, 1/2) | 7 | 104 | 224 | 328 | 472 | 584 | 680 | 968 | 1224 |
| (1, 1) | (1, 1) | (1, 3/4) | (3/4, 3/4) | (3/4, 3/4) | (3/4, 1/2) | (1/2, 1/2) | (1/2, 1/2) | 8 | 120 | 256 | 392 | 536 | 680 | 808 | 1096 | 1352 |
| (1, 3/4) | (1, 3/4) | (1, 3/4) | (3/4, 3/4) | (3/4, 3/4) | (3/4, 1/2) | (1/2, 1/2) | (1/2, 1/2) | 9 | 136 | 296 | 456 | 616 | 776 | 936 | 1256 | 1544 |
| (1, 3/4) | (1, 3/4) | (1, 3/4) | (3/4, 3/4) | (3/4, 3/4) | (3/4, 1/2) | (1/2, 1/2) | (1/2, 1/2) | 10 | 144 | 328 | 504 | 680 | 872 | 1032 | 1384 | 1736 |
| (1, 3/4) | (1, 3/4) | (1, 3/4) | (3/4, 1/2) | (3/4, 1/2) | (3/4, 1/2) | (1/2, 1/2) | (1/2, 1/2) | 11 | 176 | 376 | 584 | 776 | 1000 | 1192 | 1608 | 2024 |
| (1, 3/4) | (1, 3/4) | (1, 3/4) | (3/4, 1/2) | (3/4, 1/2) | (3/4, 1/2) | (1/2, 1/2) | (1/2, 1/2) | 12 | 208 | 440 | 680 | 904 | 1128 | 1352 | 1800 | 2280 |
| (1, 3/4) | (1, 3/4) | (1, 3/4) | (3/4, 1/2) | (3/4, 1/2) | (3/4, 1/2) | (1/2, 1/2) | (1/2, 1/2) | 13 | 224 | 488 | 744 | 1128 | 1256 | 1544 | 2024 | 2536 |

The β and α values are optional. Indicator 2 in the table of method 2 represents that a code rate is greater than or equal to a code rate of indicator 1, and the number of RU is greater than or equal to the number of indicated RU.

Example 5

The example is mainly used for completing DCI content design under low overhead in different scenes of TBS during multi-TB scheduling enhancement. It mainly elaborates a method for achieving multi-TB classification and scheduling by using one DCI in a scene of multiple TBs.

During multi-TB scheduling, a situation may occur in which the multiple TBs all need to be retransmitted, while some TBs need to be newly transmitted, resulting in inconsistencies of multiple TBS. The size of the retransmitted TB may be different from that of the originally transmitted TB, and each newly transmitted TB may also be different. In the case that the multiple TBS with different sizes is transmitted in a mixed manner, great signaling overhead may be caused. The TBs are classified according to the TBS on the basis of 2-TB transmission. The TBs of the same type are consistent in TBS size and reuse the same signaling indicator. Different types of TBs need to be indicated differently. If the types of TB are relatively large, not only the overhead of how to indicate classification is high, but also the overhead of the modulation encoding and the voluntary assignment field of each type are higher. It is limited that only two types of TBs are transmitted in one DCI. The solution for DCI design is:

Method 1: TB classification+class-based offset

The method of class-based offset is consistent with the 2-TB transmission indicator method. The TB classification and indicator methods are mainly discussed below. TBs are classified into two types at most, and two transmission solution exist, namely, transmission of two types of TBs and transmission of only one type of TBs. The situations in which the two occur are discussed separately.

Transmission of one type of TBs: when the multiple TBs is transmitted, the sizes of all the TBs transmitted by the DCI content are consistent at the moment, and no extra indicator is needed. At this time, the multiple TBs may be newly transmitted, or all TBs may be retransmitted, and there is a small possibility of hybrid new transmission and retransmission.

Transmission of two types of TBs: when the multiple TBs is transmitted, one DCI content needs to represent two pieces of different TBS information at the moment. At the moment, new transmission and retransmission may be carried out together, and there is a small possibility of all new transmission or all retransmission.

When multiple TBs are scheduled, how many of TBs per type need to be known by a user in order to facilitate decoding.

1). Classification of the multiple TBs may be indicated with 1 bit-2 bits when 4-TB scheduling is supported. There are mainly three solutions for classification as follows:
  Solution 1-1: 2+2, that is, 4 TBs are classified into two types, each type having 2 TBs.
  Solution 1-2: 1+3, that is, 4 TBs are classified into two types, one type having 1 TB, and the other type having 3 TBs.
  Solution 1-3: no classification, that is, only one type exists.
  Solution 1-1+Solution 1-3 may be selected when 1 bit is used. When the overhead uses 2 bits, the three solutions may all be indicated.

2). Classification of the multiple TBs may be indicated with 1-3 bits when 8-TB scheduling is supported. There are mainly five solutions for classification as follows:
  Solution 2-1: 4+4, that is, 8 TBs are classified into two types, each type having 4 TBs.
  Solution 2-2: 3+5, that is, a first type has 3 TBs, and a second type has 5 TBs.
  Solution 2-3: 2+6, that is, a first type has 2 TBs, and a second type has 6 TBs.
  Solution 2-4: 1+7, that is, a first type has 1 TB, and a second type has 7 TBs.
  Solution 2-5: no classification, that is, 8 TBS are identical.
  Solutions 2-5 and 2-1 may be selected when 1 bit is used, and solutions 2-1, 2-2, 2-3 and 2-5 are used when 2 bits are used. All solutions are used when 3 bits are used.

3) 1 to N/2+1 solutions may be used for describing the classification of the N (N is an even number) TBs when N-TB scheduling is supported, a needed overhead range is 1 to and the solutions are mainly as follows:
  Solution 3-1: N/2+N/2, that is, each type has 4 TBs.
  Solution 3-2: (N/2−1)+(N/2+1)
  Solution 3-m: (N/2−m+1)+(N+m−1)
  Solution 3-N/2: 1+(N−1)
  Solution 3-N/2+1: no classification.

Averaging and non-classification solutions may be selected when 1 bit is used. Other solutions are added on the basis of the averaging solution and the non-classification solution when 2 bits or more are used, making the difference between the numbers of the two types of TBs small as much as possible. It is agreed that the previous type of TBs is indicated by indicator 1, and the second type of TBs is indicated by indicator 2.

The above classification solutions must match multi-TB transmission, for example, when 8-TB scheduling supports mixed transmission and the 3+5 solution is adopted, the first three are in one type, and the last five are in one type. When the second DCI performs transmission, 12 processes are retransmitted, the last five processes may be retransmitted or newly transmitted, and all of these states must be supported during mixed transmission. During multi-TB scheduling, the indicator 1 is not guaranteed to be a retransmission indicator.

In this embodiment, two methods for describing classifying the multiple TBs during multi-TB scheduling are given. By adding the limiting conditions, the TBs are classified into two types, specific allocation solutions are elaborated in detail, main solutions are expressed, and DCI overhead thereof is reduced. The DCI indicator during multi-TB scheduling is achieved.

Example 6

The embodiment is mainly used for completing DCI content design under low overhead in different scenes of TBS during multi-TB scheduling enhancement. It mainly elaborates an indicator method for the multiple TBs in the same DCI during common transmission. The sizes of the multiple TB may differ from one another.

Assuming that N TBs need to be scheduled in the DCI, the N TBs are classified into M types, M<=N, and each type of TBs is identical in size. Compared with the multi-TB scheduling with identical TBS, the newly added content of the DCI is the classification overhead of the TB and the extra indicator overhead when the TBS is different. The indicator mode is similar to Example 3 and is TB classification+class-based offset. To reduce overhead, more limitations on TB classification and class-based offset need to be made.

1) Classification Method

It may only be classified into two types by using 1 bit, which is identical to Example 3. So the classification overhead is a minimum of 2 bits in this embodiment, based on the minimum overhead of 2, the classification method is as follows:
  When N>=8, M=1, 2 or 1, 4 or 1, 2, 4 and 8
  When N=4, M=1, 2 or 1, 4 or 1, 2 and 4
  When N=1, M=1;
  When N=2, M=1 or M=0, 1

In this embodiment, a classification method and a DCI indicator method are mainly discussed when N>=8. At the moment, the TBs are classified into M types, and one TB is allocated one process at least in each type.

When N=8, M=1, 2, 4, 8, and when there is one type, all TBS are consistent. When M=8, each TB size is different. When M=2, the classification method is consistent with Example 3, and when M=4, one type of TBs contains 2 TBs, corresponding to the process numbers in order. All states of the classification indicator are as shown in the following table:

| M | DCI |
| --- | --- |
| 1 | 00 |
| 2 | 01 |
| 4 | 10 |
| 8 | 11 |

When M=4, there are other classification methods, for example, 3+3+1+1 represent three TBs of each of the first type of TBs and the second type of TBs and one TB of each of the third type of TBs and the fourth type of TBs. When M=4, all the solution are as follows: 5+1+1+1; 4+2+1+1; 3+3+1+1; 3+2+2+1; 2+2+2+2; and there are 5 solutions in total, so if all solution need to be represented, 1 bit extra overhead is needed. From the aspects of overhead and complexity, the 2+2+2+2 solution is suggested to be directly used.

When N is other values, M still is $2^0, 2^1, 2^2, 2^3, \ldots 2^m$, $2^m<=N$. It is set that N=X020+X121+X222+X323+ . . . +Xm2m. Xm is not a binary number. When M is 2m, a high-order coefficient is made to be as large as possible.

For example, N=16; when M=24=16, X4=1; X0=X1=X2=X3=0;

when M=23=8, X3=2; X0=X1=X2=0;
when M=22=4; X2=4; X0=X1=0;
when M=21=2; X1=8; X0=0;
When M=1, X1=16;

M represents that the multiple TBs are classified into M types, and the coefficient Xm represents the number of TBs classified into each type when the multiple TBs are classified into 2m types. When the coefficient of a certain type is 0, it is indicated that the type does not exist.

When N=10, N=X020+X121+X222+X323.

When M=8, X3=1; X1=1; X0=X2=0, which represents that the first type of TBs contains two, the second type of TBs contains two, and the third to eighth types of TBs each contain one TB.

When N=12, M=8, X3=1, X2=1, and the rest coefficients are 0, wherein X3=1 represents that each type has one TB when the TBs are classified into M=8 types, and X2=1 represents that each type is added with one TB when the TBs are classified into the first four types in the 8 types.

When N=16, taking 5 values for M needs 3 bits for representation, obviously some states are wasted, such that M<=8 is defined here. The above classification rule is unchanged, for example, when N=16, N=X020+X121+X222+X323, obviously X3=2, representing that the TBs are classified into 8 types of 2 identical TBs each. In summary, the method of classification is as follows:

N=X020+X121+X222+X323, and a following principle is that the high-order coefficient is maximum and the low-order coefficient is minimum.

2) Class-Based Offset

With no constraint, the offset between the types may be large, and when the number of the TBs is large and the types are large, the needed signaling overhead is large. Under the condition of one type or two types, the method of embodiment 3 is suitable, and obviously excessive overhead is not suitable for signaling transmission when the TBs are classified into four types or eight types. Strong constraint conditions are added to achieve the effect of indicating various types of TBS.

Constraint conditions: binding is carried out on the basis of DCI modulation encoding and resource assignment field configuration of a certain type. One type corresponds to one TBS value. The binding method is as follows:

In the table, $I_{SF}$ of 4 and $I_{TBS}$ of 6 (corresponding to the 7th row and the 5th column in the table, that is, the part with the value of 504) are the DCI direct indicator content, and then 2 bits are added to indicate the offset direction of the DCI direct indicator content and indicate upper, lower, left and right directions separately. An anticlockwise direction corresponds to a TB type number from small to large by default. When the TBs are classified into four types, an area with $I_{SF}$ of 4 and $I_{TBS}$ of 6 in the table is a direct indicator of a first type, and a 2-bit direction indicator is downward, and parts with $I_{TBS}$ of 6 and corresponding $I_{SF}$ of 5, 6 and 7 and parts with $I_{TBS}$ of 7 and corresponding $I_{SF}$ of 4, 5, 6 and 7 are the second type, the third type and the fourth type separately. In the anticlockwise direction, TBS=584 is of the second type, 680 is of the third type, and 600 is of the fourth type. When the direction indicator is rightward, 504 is of the first type, 600 is of the second type, 504 is of the third type, and 424 is of the fourth type. The direction indicator is based on the position of the next type of the first type and thus generates indicators of all types. In the case that the TBs are classified into 8 types, a 2*4 structure is used. When the indicator is downward, search is performed for one unit downward, then for four units rightward, for another unit upward and for two units leftward, thereby obtaining eight types. When the indicator is upward, search is performed for one unit upward, for four units leftward, then for one unit downward, for two units rightward, and so on.

| | $I_{SF}$ | | | | | | | |
|---|---|---|---|---|---|---|---|---|
| $I_{TBS}$ | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1128 | 1256 | 1544 | 2024 | 2536 |

In this embodiment, a method for classifying multiple TBs during multi-TB scheduling is given. A DCI design method is provided for scheduling of multiple types of TBs. The total extra overhead includes 2-bit direction information and 2-bit classification information. Scheduling of the multiple types of TBs may be achieved by adding 4 bits in total.

From the description of the above embodiments, it will be apparent to those skilled in the art that the methods according to the embodiments mentioned above may be achieved through software plus a general-purpose hardware platform, of course may also be achieved through hardware. Based on the understanding, the technical solution provided by the present disclosure may be embodied in a form of a software product in essence or a part contributing to the related technology, and the computer software product is stored in a storage medium (such as ROM/RAM, a magnetic disk and an optical disk), and includes multiple instructions for enabling a terminal device (such as a mobile phone, a computer, a server or a network device) to execute the method of each embodiment of the present disclosure.

Embodiment 2

The embodiment also provides a transport block (TB) scheduling device, and the device is used for achieving the embodiment and the implementation mode and is not described in detail. The term "module", as used below, may achieve a combination of software and/or hardware with predetermined functions. While the device described in the following embodiments is preferably achieved in software, achievement of hardware, or a combination of software and hardware, are also possible and contemplated.

Figure 2:
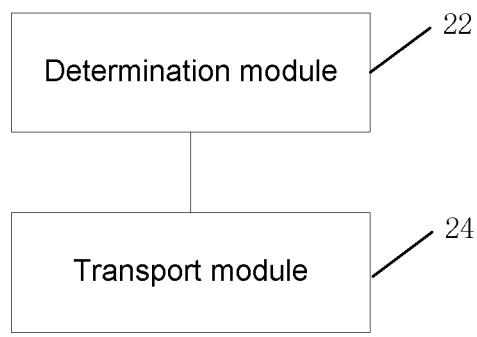
FIG. 2 is a structure block diagram of a TB scheduling device according to the embodiment of the present disclosure.

FIG. 2 is a structure block diagram of a TB scheduling device according to the embodiment of the present disclosure, and as shown in FIG. 2, the device includes:

a determination module 22, used for determining, when one downlink control information (DCI) schedules multiple TBs, the sizes of the multiple TBs through a resource assignment field, an MCS field, offset value indicator information and new data indicator (NDI) information of the DCI, the NDI information being used for determining whether the multiple TBs are newly transmitted or retransmitted; or determining the sizes of the multiple TBs through the resource assignment field, the MCS field, and the offset value indicator information of the DCI; and a transport module 24, used for transmitting the DCI over a physical downlink control channel (PDCCH).

It should be noted that the transport module 24 mentioned above includes a base station transmitting the DCI to a terminal and the terminal receiving the DCI.

In some embodiments, a value of the offset value indicator information is determined according to at least one of the resource assignment field, the MCS field, and the NDI information.

Figure 3:
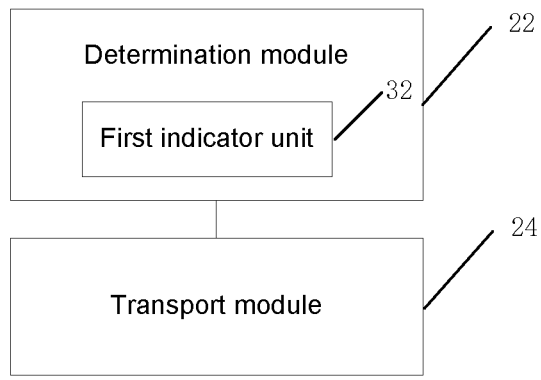
FIG. 3 is a first structure block diagram of the multi-TB scheduling device according to the embodiment of the present disclosure.

FIG. 3 is a first structure block diagram of the multi-TB scheduling device according to the embodiment of the present disclosure, and as shown in FIG. 3, the determination module 22 includes:

a first indicator unit 32, used for indicating, under the conditions that one DCI schedules two TBs, indicator values $I_{TBS}$ of MCS fields of the two TBs are identical and NDI information of the two TBs is identical, the index $I_{SF}$ of the resource allocation amount in a resource assignment field of the second TB through a 3-bit offset value indicator information, or, $I_{SF}$ in a resource assignment field of the second TB through a 1-bit or 2-bit offset value indicator information, wherein indicator 2=indicator 1+transverse position offset β, or, $I_{SF}$ in a resource assignment field of the second TB through a 1-bit offset value indicator information, wherein indicator 2=an integer from rounding [indicator 1*transverse position offset β];

wherein indicator 1 is the number of resources indicated by a resource number indicator domain in the DCI, and indicator 2 is the actual number of newly transmitted resources, or indicator 2 is the actual number of retransmitted resources.

Figure 4:
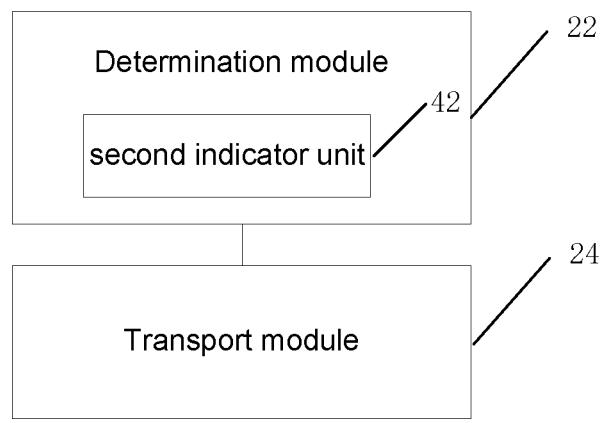
FIG. 4 is a second structure block diagram of the multi-TB scheduling device according to the embodiment of the present disclosure.

FIG. 4 is a second structure block diagram of the multi-TB scheduling device according to the embodiment of the present disclosure, and as shown in FIG. 4, the determination module 22 includes:

a second indicator unit 42, used for indicating, in the case that one DCI schedules two TBs and the NDI information corresponding to the two TBs is different, when indexes $I_{SF}$ of the resource allocation amount in resource assignment fields of the two TBs are identical, an indicator value $I_{TBS}$ of an MCS field of the second TB through a 4-bit offset value indicator information, or, when $I_{SF}$ and $I_{TBS}$ of the two TBs are different, the corresponding offset parameters, that is, transverse position offset β and longitudinal position offset α, of the $I_{SF}$ and $I_{TBS}$ of the second TB through a 3 bit offset value indicator information, wherein $[I_{SF2} I_{TBS2}] = [I_{SF1} I_{TBS1}] + [\beta\alpha]$, or, the corresponding offset parameters, that is, transverse position offset β and longitudinal position offset α, of the $I_{SF}$ and $I_{TBS}$ of the second TB through a 2-bit offset value indicator information, wherein $[I_{SF2} I_{TBS2}]$=an integer from rounding $[I_{SF1}*\beta\ I_{TBS1}*\alpha]$;

wherein $[I_{SF2} I_{TBS2}]$ represents a resource assignment field indicator value and an MCS field indicator value of indicator 2, and $[I_{SF1} I_{TBS1}]$ represents a resource assignment field indicator value and an MCS field indicator value of indicator 1, indicator 1 being TBS indicated by $I_{SF}$ and $I_{TBS}$ in the DCI, indicator 2 being TBS of a newly transmitted TB, or indicator 2 being TBS of a retransmitted TB.

Figure 5:
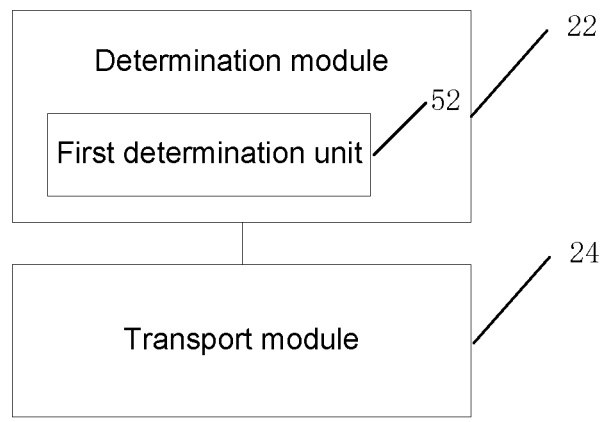
FIG. 5 is a third structure block diagram of the multi-TB scheduling device according to the embodiment of the present disclosure.

FIG. 5 is a third structure block diagram of the multi-TB scheduling device according to the embodiment of the present disclosure, and as shown in FIG. 5, the determination module 22 includes:

a first determination unit 52, used for determining $I_{SF}$ and IBS corresponding to indicator 2 according to an index $I_{SF}$ of the resource allocation amount or an indicator value $I_{TBS}$ of the MCS field of indicator 1, indicator 1 being TBS indicated by $I_{SF}$ and $I_{TBS}$ in the DCI, indicator 2 being TBS of a newly transmitted TB, or indicator 2 being TBS of a retransmitted TB.

In some embodiments, the first determination unit 52 is further used that under the conditions that one DCI schedules two TBs, the indicator values $I_{TBS}$ of the MCS fields of the two TBs are identical, and the two TBs are both newly transmitted or retransmitted, indicator 2=indicator 1+transverse position offset β;
or indicator 2=an integer from rounding [indicator 1*transverse position offset β], wherein β is determined according to $I_{SF}$ and IBS of indicator 1, or according to $I_{TBS}$ of indicator 1 and the resource allocation amount $N_{SF}$.

In some embodiments, the first determination unit 52 is further used that in the case that one DCI schedules two TBs and the NDI information corresponding to the two TBs is different, $[I_{SF2}I_{TBS2}]=[I_{SF}I_{TBS1}]+[\beta\alpha]$, or, $[I_{SF2}I_{TBS2}]$=an integer from rounding $[I_{SF1}*\beta I_{TBS1}*\alpha]$, Wherein β is a transverse offset, α is a longitudinal offset, α and β are determined according to $I_{SF}$ and $I_{TBS}$ of indicator 1, or $I_{TBS}$ and the resource allocation amount $N_{SF}$;

wherein $[I_{SF2} I_{TBS2}]$ represents a resource assignment field indicator value and an MCS field indicator value of indicator 2, and $[I_{SF1} I_{TBS1}]$ represents a resource assignment field indicator value and an MCS field indicator value of indicator 1.

Figure 6:
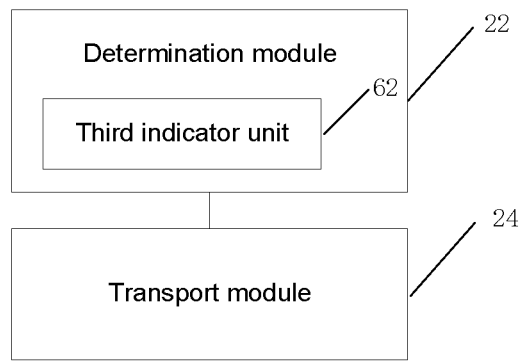
FIG. 6 is a fourth structure block diagram of the multi-TB scheduling device according to the embodiment of the present disclosure.

FIG. 6 is a fourth structure block diagram of the multi-TB scheduling device according to the embodiment of the present disclosure, and as shown in FIG. 6, the determination module 22 includes:

a third indicator unit 62, used for classifying, in the case that the DCI schedules N TBs, the N TBs into a first type of TBs and a second type of TBs, N being an even number larger than 2, indicating classification information of the N TBs through k bits, a value range of k being $$[1, \operatorname{ceil}(\log_2^{N/2+1})];$$

and indicating, in the case that the indicator values $I_{TBS}$ of MCS fields of the N TBs are identical and the first type of TBs and the second type of TBs are both newly transmitted or retransmitted, an index $I_{SF}$ of the resource allocation amount in a resource assignment field of the second type of TBs through a 3-bit offset value indicator information, or, $I_{SF}$ in a resource assignment field of the second type of TBs through a 1-bit or 2-bit offset value indicator information, wherein indicator 2=indicator 1+transverse position offset β, or, $I_{SF}$ in a resource assignment field of the second type of TBs through a 1-bit offset value indicator information, wherein indicator 2=an integer from rounding [indicator 1*transverse position offset β], the indicator 1 is a TBS of the first type of TBs indicated by the $I_{SF}$ and $I_{TBS}$ in the resource assignment field of the DCI, and indicator 2 is a TBS of the second type of TBs indicated by the $I_{SF}$ and $I_{BS}$ in the resource assignment field of the DCI.

Figure 7:
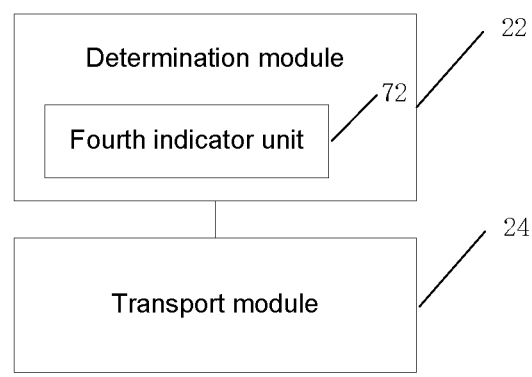
FIG. 7 is a fifth structure block diagram of the multi-TB scheduling device according to the embodiment of the present disclosure.

FIG. 7 is a fifth structure block diagram of the multi-TB scheduling device according to the embodiment of the present disclosure, and as shown in FIG. 7, the determination module 22 includes:

a fourth indicator unit 72, used for classifying, in the case that the DCI schedules N TBs, the N TBs into a first type of TBs and a second type of TBs, N being an even number larger than 2; indicating classification information of the N TBs through one of 1 to $$\text{ceil}(\log_2^{N/2+1})$$

bit offset value indicator information; and indicating, in the case that the N TBs are transmitted in a manner of hybrid new transmission and retransmission, when indexes $I_{SF}$ of the resource allocation amount of the first type of TBs and the second type of TBs are identical, an indicator value $I_{TBS}$ of an MCS field of the second type of TBs through a 4-bit offset value indicator information; and when $I_{SF}$ and $I_{TBS}$ of the first type of TBs and the second type of TBs are different, the corresponding offset parameters, that is, transverse position offset β and longitudinal position offset α, of the $I_{SF}$ and $I_{TBS}$ of the second type of TBs through a 3-bit offset value indicator information, wherein $[I_{SF2}\ I_{TBS2}]=[I_{SF1}\ I_{TBS1}]+[β\ α]$, or, the corresponding offset parameters, that is, transverse position offset β and longitudinal position offset α, of the $I_{SF}$ and IBS of the second type of TBs through a 2-bit offset value indicator information, wherein $[I_{SF2}\ I_{TBS2}]$=an integer from rounding $[I_{SF1}*β\ I_{TBS1}*α]$ wherein $[I_{SF2}\ I_{TBS2}]$ represents a resource assignment field indicator value and an MCS field indicator value of indicator 2, and $[I_{SF1}\ I_{TBS1}]$ represents a resource assignment field indicator value and an MCS field indicator value of indicator 1;

the indicator 1 is a TBS of the first type of TBs indicated by the $I_{SF}$ and $I_{TBS}$ in the resource assignment field of the DCI, and indicator 2 is a TBS of the second type of TBs indicated by the $I_{SF}$ and $I_{TBS}$ in the resource assignment field of the DCI.

Figure 8:
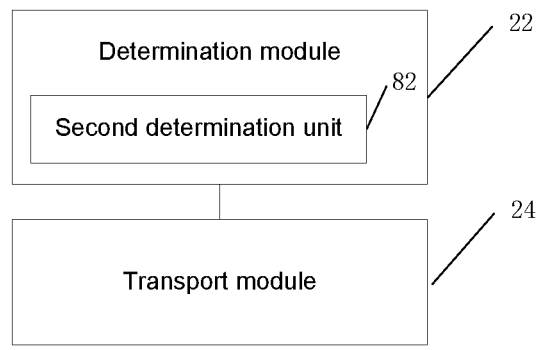
FIG. 8 is a sixth structure block diagram of the multi-TB scheduling device according to the embodiment of the present disclosure.

FIG. 8 is a sixth structure block diagram of the multi-TB scheduling device according to the embodiment of the present disclosure, and as shown in FIG. 8, the determination module 22 includes:

a second determination unit 82, used for classifying, in the case that the DCI schedules N TBs, the N TBs into a first type of TBs and a second type of TBs, N being an even number larger than 2, indicating classification information of the N TBs through one of 1 to $$\text{ceil}(\log_2^{N/2+1})$$

bit offset value indicator information; and determining $I_{SF}$ and $I_{TBS}$ corresponding to indicator 2 according to an index $I_{SF}$ of the resource allocation amount in the resource assignment field or an indicator value $I_{TBS}$ of the MCS field of indicator 1;

the indicator 1 is a TBS of the first type of TBs indicated by the $I_{SF}$ and $I_{TBS}$ in the resource assignment field of the DCI, and indicator 2 is a TBS of the second type of TBs indicated by the $I_{SF}$ and IBS in the resource assignment field of the DCI.

In some embodiments, the second determination unit 82 is further used that under the conditions that the DCI schedules the N TBs, $I_{TBS}$ of the first type of TBs and the second type of TBs are identical and the first type of TBs and the second type of TBs are both newly transmitted or retransmitted, indicator 2=indicator 1+transverse position offset β;
or indicator 2=an integer from rounding [indicator 1*transverse position offset β], wherein β is determined according to $I_{SF}$ and $I_{TBS}$ of indicator 1, or according to $I_{TBS}$ of indicator 1 and the resource allocation amount $N_{SF}$.

In some embodiments, the second determination unit 82 is further used for that:

in the case that the DCI schedules the N TBs and the first type of TBs and the second type of TBs are transmitted in a manner of hybrid new transmission and retransmission, indicator 2=indicator 1+transverse position offset β+longitudinal position offset α; or indicator 2=an integer from rounding [indicator 1*transverse position offset β]+an integer from rounding [indicator 1*longitudinal position offset α], wherein α and β is determined according to $I_{TBS}$ and $I_{SF}$ of indicator 1, or according to $I_{TBS}$ of indicator 1 and the resource allocation amount $N_{SF}$.

It should be noted that the various modules mentioned above may be achieved in software or hardware, achievement in hardware may be implemented as follows but are not limited thereto: the modules mentioned above are located in the same processor; or the modules mentioned above are separately located in different processors in any combination form.

Embodiment 3

The embodiment of the present disclosure further provides a storage medium, having a computer program stored therein, wherein the computer program is configured to execute the steps of any one of the above mentioned method embodiments at runtime.

In some embodiments, in this embodiment, the storage medium mentioned above may be configured to store a computer program to execute the steps:

S1, in the case that one downlink control information (DCI) schedules multiple TBs, the sizes of the multiple TBs are determined through a resource assignment field, an MCS field, offset value indicator information and new data indicator (NDI) information of the DCI, the NDI information being used for determining whether the multiple TBs are newly transmitted or retransmitted; or the sizes of the multiple TBs are determined through the resource assignment field, the MCS field, and the offset value indicator information of the DCI; and S2, the DCI is transmitted over PDCCH.

In some embodiments, in this embodiment, the storage medium mentioned above may include, but is not limited to, a universal serial bus flash disk (USB), a read-only memory (ROM), a random access memory (RAM), a removable hard disk, a magnetic disk, or an optical disk, and various media that may store the computer program.

Embodiment 4

The embodiment of the present disclosure further provides an electronic device, including a memory and a processor, wherein the memory has a computer program stored therein, and the processor is configured to run the computer program to execute the steps of any one of the above mentioned method embodiments.

In some embodiments, the electronic device may further includes a transmission apparatus and an input/output apparatus, wherein the transmission apparatus is connected to the processor mentioned above and the input/output apparatus is connected to the processor mentioned above.

In some embodiments, in this embodiment, the processor mentioned above may be configured to execute the following steps through the computer program:

S1, in the case that one downlink control information (DCI) schedules multiple TBs, sizes of the multiple TBs are determined through a resource assignment field, an MCS field, offset value indicator information and new data indicator (NDI) information of the DCI, the NDI information being used for determining whether the multiple TBs are newly transmitted or retransmitted; or the sizes of the multiple TBs are determined through the resource assignment field, the MCS field, and the offset value indicator information of the DCI; and S2, the DCI is transmitted over PDCCH.

In some embodiments, specific examples in this embodiment may be referred to the examples described in the above-mentioned embodiments and optional implementations, which are not described in detail herein.

Obviously, those skilled in the art will appreciate that the modules or steps of the present disclosure mentioned above may be achieved with a general-purpose computation device, and may be centralized on a single computation device or distributed on a network composed of multiple computation devices, in some embodiments, they may be achieved with program codes executable by the computation device, such that they may be stored in a storage device to be executed by the computation device, and under some conditions, the steps shown or described may be executed in an order different from that herein, or they may be fabricated separately as individual integrated circuit modules, or multiple modules or steps of them may be fabricated as a single integrated circuit module for achievement. Thus, the present disclosure is not limited to any combination of particular hardware and software.

What is claimed is:

1. A transport block (TB) scheduling method, comprising:
in a case that one downlink control information (DCI) schedules multiple TBs, indicating sizes of the multiple TBs through a resource assignment field, a Modulation and Coding Scheme (MCS) field, offset value indicator information and new data indicator (NDI) information of the DCI, the NDI information being used for determining whether the multiple TBs are newly transmitted or retransmitted; or indicating sizes of the multiple TBs through the resource assignment field, the MCS field, and the offset value indicator information of the one DCI; and
transmitting the DCI over a physical downlink control channel (PDCCH);
wherein a value of the offset value indicator information is determined according to the MCS field.

2. The method as claimed in claim 1, wherein in the case that one DCI schedules multiple TBs, indicating sizes of the multiple TBs through a resource assignment field, an MCS field, offset value indicator information and NDI information of the DCI; or
indicating sizes of the multiple TBs through the resource assignment field, the MCS field, and the offset value indicator information of the one DCI comprises:
in a case that the one DCI schedules a first TB and a second TB, indicator values $I_{TBS}$ of MCS fields of the first TB and the second TB are identical and NDI information of the first TB and the second TB are identical,
indicating an index $I_{SF}$ of a resource allocation amount in a resource assignment field of the second TB through a 3-bit offset value indicator information; or,
indicating $I_{SF}$ in a resource assignment field of the second TB through a 1-bit or 2-bit offset value indicator information, wherein indicator 2=indicator 1+transverse position offset β; or,
indicating $I_{SF}$ in a resource assignment field of the second TB through a 1-bit offset value indicator information, wherein indicator 2=an integer from rounding [indicator 1*transverse position offset β],
indicator 1 being the number of resources indicated by a resource number indicator domain in the DCI, and indicator 2 being the actual number of newly transmitted resources, or indicator 2 is the actual number of retransmitted resources.

3. The method as claimed in claim 1, wherein in the case that one DCI schedules multiple TBs, indicating sizes of the multiple TBs through a resource assignment field, an MCS field, offset value indicator information and NDI information of the one DCI; or
indicating sizes of the multiple TBs through the resource assignment field, the MCS field, and the offset value indicator information of the one DCI comprises:
in a case that the one DCI schedules a first TB and a second TB, and NDI information corresponding to the first TB and NDI information corresponding to the second TB are different, and
in a case that indexes $I_{SF}$ of a resource allocation amount in resource assignment fields of the first TB and the second TB are identical, indicating an indicator value $I_{TBS}$ of an MCS field of the second TB through a 4-bit offset value indicator information; or, in a case that both $I_{SF}$ and $I_{TBS}$ of the first TB and the second TB are different, indicating a transverse position offset β and α longitudinal position offset α corresponding to the $I_{SF}$ and $I_{TBS}$ of the second TB through a 3-bit offset value indicator information, wherein $[I_{SF2}\ I_{TBS2}]=[I_{SF1}\ I_{TBS1}]+[β\ α]$; or, indicating a transverse position offset β and a longitudinal position offset α corresponding to the $I_{SF}$ and $I_{TBS}$ of the second TB through a 2-bit offset value indicator information, wherein $[I_{SF2}\ I_{TBS2}]$=an integer from rounding $[I_{SF1}*β\ I_{TBS1}*α]$;

wherein $[I_{SF2}\ I_{TBS2}]$ represents a resource assignment field indicator value and an MCS field indicator value of indicator 2, and $[I_{SF1}\ I_{TBS1}]$ represents a resource assignment field indicator value and an MCS field indicator value of indicator 1;

indicator 1 being a transport block size (TBS) indicated by $I_{SF}$ and $I_{TBS}$ in the DCI, and indicator 2 being a TBS of a newly transmitted TB, or indicator 2 being a TBS of a retransmitted TB.

4. The method as claimed in claim 1, wherein indicating sizes of the multiple TBs through a resource assignment field, an MCS field, offset value indicator information and NDI information of the one DCI comprises:

determining $I_{SF}$ and $I_{TBS}$ corresponding to indicator 2 according to an index $I_{SF}$ of a resource allocation amount or an indicator value $I_{TBS}$ of the MCS field of indicator 1;

wherein indicator 1 is a TBS indicated by $I_{SF}$ and $I_{TBS}$ in the DCI, and the indicator 2 is a TBS of a newly transmitted TB, or the indicator 2 is a TBS of a retransmitted TB.

5. The method as claimed in claim 4, wherein determining $I_{SF}$ and $I_{TBS}$ corresponding to indicator 2 according to $I_{SF}$ or $I_{TBS}$ of indicator 1 comprises:

in a case that the one DCI schedules two TBs, the indicator values $I_{TBS}$ of the MCS fields of the two TBs are identical, and the two TBs are both newly transmitted or retransmitted, indicator 2=indicator 1+transverse position offset β;
or indicator 2=an integer from rounding [indicator 1*transverse position offset β], wherein β is determined according to $I_{TBS}$ and $I_{SF}$ of indicator 1, or according to $I_{TBS}$ and the resource allocation amount $N_{SF}$ of indicator 1.

6. The method as claimed in claim 4, wherein the determining $I_{SF}$ and $I_{TBS}$ corresponding to indicator 2 according to $I_{SF}$ or $I_{TBS}$ of indicator 1 comprises:

in a case that the one DCI schedules two TBs and the NDI information corresponding to the two TBs are different, $[I_{SF2}I_{TBS2}]=[I_{SF1}I_{TBS1}]+[βα]$, or $[I_{SF2}I_{TBS2}]$=an integer from rounding $[I_{SF1}*βI_{TBS1}*α]$, wherein β is a transverse position offset, α is a longitudinal position offset, α and β are determined according to $I_{TBS}$ and $I_{SF}$ of indicator 1 or $I_{TBS}$ and the resource allocation amount, $[I_{SF2}\ I_{TBS2}]$ represents a resource assignment field indicator value and an MCS field indicator value of indicator 2, and $[I_{SF1}\ I_{TBS1}]$ represents a resource assignment field indicator value and an MCS field indicator value of indicator 1.

7. The method as claimed in claim 1, wherein in the case that one DCI schedules multiple TBs, indicating sizes of the multiple TBs through a resource assignment field, an MCS field, and NDI information of the DCI comprises:

in a case that the one DCI schedules N TBs, and the N TBs are divided into a first type of TBs and a second type of TBs, N being an even number larger than 2, indicating classification information of the N TBs through k bits, a value range of k being $$[1, \operatorname{ceil}(\log_2^{N/2+1})];$$

and in a case that indicator values $I_{TBS}$ of MCS fields of the N TBs are identical and the first type of TBs and the second type of TBs are both newly transmitted or retransmitted, indicating an index $I_{SF}$ of the resource allocation amount in a resource assignment field of the second type of TBs through a 3-bit offset value indicator information; or, indicating $I_{SF}$ in a resource assignment field of the second type of TBs by a 1-bit or 2-bit offset value indicator information, wherein indicator 2=indicator 1+transverse position offset β; or, indicating $I_{SF}$ in a resource assignment field of the second type of TBs by a 1-bit offset value indicator information, wherein indicator 2=an integer from rounding [indicator 1*transverse position offset β], indicator 1 being TBS of the first type of TBs indicated by the $I_{SF}$ and $I_{TBS}$ in the resource assignment field of the DCI, and indicator 2 being TBS of the second type of TBs indicated by the $I_{SF}$ and $I_{TBS}$ in the resource assignment field of the DCI.

8. The method as claimed in claim 1, wherein in the case that one DCI schedules multiple TBs, indicating sizes of the multiple TBs through a resource assignment field, an MCS field, offset value indicator information and NDI information of the one DCI; or indicating sizes of the multiple TBs through the resource assignment field, the MCS field, and the offset value indicator information of the one DCI comprises:

in a case that the one DCI schedules N TBs, and the N TBs are divided into a first type of TBs and a second type of TBs, N being an even number larger than 2; indicating classification information of the N TBs through one of 1 to $$\operatorname{ceil}(\log_2^{N/2+1})$$

bit offset value indicator information; and in a case that the N TBs are transmitted in a manner of hybrid new transmission and retransmission, and in a case that indexes $I_{SF}$ of the resource allocation amount of the first type of TBs and the second type of TB are identical, indicating an indicator value $I_{TBS}$ of an MCS field of the second type of TBs through a 4-bit offset value indicator information; and in a case that both $I_{SF}$ and $I_{TBS}$ of the first type of TBs and the second type of TBs are different, indicating transverse position offset β and longitudinal position offset α corresponding to $I_{SF}$ and $I_{TBS}$ of the second type of TBs through a 3-bit offset value indicator information, wherein $[I_{SF2}\ I_{TBS2}]=[I_{SF1}\ I_{TBS1}]+[β\ α]$; or indicating the transverse position offset β and longitudinal position offset α corresponding to $I_{SF}$ and $I_{TBS}$ of the second type of TBs through a 2-bit offset value indicator information, wherein $[I_{SF2}\ I_{TBS2}]$=an integer from rounding $[I_{SF1}*β\ I_{TBS1}*α]$;

wherein $[I_{SF2}\ I_{TBS2}]$ represents a resource assignment field indicator value and an MCS field indicator value of indicator 2, and $[I_{SF1}\ I_{TBS1}]$ represents a resource assignment field indicator value and an MCS field indicator value of indicator 1, indicator 1 being TBS of the first type of TBs indicated by the $I_{SF}$ and $I_{TBS}$ in the resource assignment field of the DCI, and indicator 2 being TBS of the second type of TBs indicated by the $I_{SF}$ and $I_{TBS}$ in the resource assignment field of the DCI.

9. The method as claimed in claim 1, wherein in the case that one DCI schedules multiple TBs, indicating sizes of the multiple TBs through a resource assignment field, an MCS field, offset value indicator information and NDI information of the DCI comprises:

in a case that the one DCI schedules N TBs, and the N TBs are divided into a first type of TBs and a second type of TBs, N being an even number larger than 2; indicating classification information of the N TBs through one of 1 to $$\text{ceil}(\log_2^{N/2+1})$$

bit offset value indicator information; and determining $I_{SF}$ and $I_{TBS}$ corresponding to indicator 2 according to an index $I_{SF}$ of the resource allocation amount in the resource assignment field or an indicator value $I_{TBS}$ of the MCS field of indicator 1, indicator 1 being TBS of the first type of TBs indicated by the $I_{SF}$ and $I_{TBS}$ in the resource assignment field of the DCI, and indicator 2 being TBS of the second type of TBs indicated by the $I_{SF}$ and $I_{TBS}$ in the resource assignment field of the DCI.

10. The method as claimed in claim 9, wherein determining $I_{SF}$ and $I_{TBS}$ corresponding to indicator 2 according to $I_{SF}$ or $I_{TBS}$ of indicator 1 comprises:

in a case that $I_{TBS}$ of the first type of TBs and $I_{TBS}$ of the second type of TBs are identical and the first type of TBs and the second type of TBs are both newly transmitted or retransmitted, indicator 2=indicator 1+transverse position offset β;
or indicator 2=an integer from rounding [indicator 1*transverse position offset β], wherein β is determined according to $I_{TBS}$ and $I_{SF}$ of indicator 1, or according to $I_{TBS}$ and the resource allocation amount $N_{SF}$ of indicator 1.

11. The method as claimed in claim 9, wherein the determining $I_{SF}$ and $I_{TBS}$ corresponding to indicator 2 according to $I_{SF}$ or $I_{TBS}$ of indicator 1 comprises:

in a case that the first type of TBs and the second type of TBs are transmitted in a manner of hybrid new transmission and retransmission, $[I_{SF2}I_{TBS2}]\_[I_{SF1}I_{TBS1}]+[βα]$; or, $[I_{SF2}I_{TBS2}]$=an integer from rounding
$[I_{SF1}*βI_{TBS1}*α]$, wherein α and β are determined according to $I_{TBS}$ and $I_{SF}$ of indicator 1, or according to $I_{TBS}$ and the resource allocation amount $N_{SF}$ of indicator 1, $[I_{SF2}\ I_{TBS2}]$ represents a resource assignment field indicator value and an MCS field indicator value of indicator 2, and $[I_{SF1}\ I_{TBS1}]$ represents a resource assignment field indicator value and an MCS field indicator value of indicator 1.

12. A transport block (TB) scheduling device, comprising:

a determination module, configured to indicate, in a case that one downlink control information (DCI) schedules multiple TBs, sizes of the multiple TBs through a resource assignment field, a Modulation and Coding Scheme (MCS) field, offset value indicator information and new data indicator (NDI) information of the one DCI, the NDI information being used for determining whether the multiple TBs are newly transmitted or retransmitted; or indicate sizes of the multiple TBs through the resource assignment field, the MCS field, and the offset value indicator information of the one DCI; and a transport module, configured to transmit the DCI over a physical downlink control channel (PDCCH);

wherein a value of the offset value indicator information is determined according to the MCS field.

13. The device as claimed in claim 12, wherein the determination module comprises:

a first indicator unit, configured to, in the case that the one DCI schedules a first TB and a second TB, indicator values $I_{TBS}$ of MCS fields of the first TB and the second TB are identical and NDI information of the first TB and the second TB is identical, indicate an index $I_{SF}$ of the resource allocation amount in a resource assignment field of the second TB through a 3-bit offset value indicator information; or, indicate $I_{SF}$ in a resource assignment field of the second TB through a 1-bit or 2-bit offset value indicator information, wherein indicator 2=indicator 1+transverse position offset β; or, indicate $I_{SF}$ in a resource assignment field of the second TB through a 1-bit offset value indicator information, wherein indicator 2=an integer from rounding [indicator 1*transverse position offset β], wherein indicator 1 is the number of resources indicated by a resource number indicator domain in the DCI, and indicator 2 is the actual number of newly transmitted resources, or indicator 2 is the actual number of retransmitted resources.

14. The device as claimed in claim 12, wherein the determination module comprises:

a second indicator unit, configured to, in a case that one DCI schedules a first TB and a second TB, and NDI information corresponding to the first TB and the second TB is different, and in a case that indexes $I_{SF}$ of the resource allocation amount in resource assignment fields of the first TB and the second TB are identical, indicate an indicator value $I_{TBS}$ of an MCS field of the second TB through a 4-bit offset value indicator information; or, in a case that both $I_{SF}$ and $I_{TBS}$ of the first TB and the second TB are different, indicate transverse position offset β and longitudinal position offset α corresponding to the $I_{SF}$ and $I_{TBS}$ of the second TB through a 3-bit offset value indicator information, wherein $[I_{SF2}\ I_{TBS2}]=[I_{SF1}\ I_{TBS1}]+[β\ α]$, or, indicate the transverse position offset β and longitudinal position offset α, of the $I_{SF}$ and $I_{TBS}$ of the second TB through a 2-bit offset value indicator information, wherein [$I_{SF2}$ $I_{TBS2}$]=an integer from rounding [$I_{SF1}$*β $I_{TBS1}$*α], [$I_{SF2}$ $I_{TBS2}$] represents a resource assignment field indicator value and an MCS field indicator value of indicator 2, [$I_{SF1}$ $I_{TBS1}$] represents a resource assignment field indicator value and an MCS field indicator value of indicator 1, β being a transverse offset, α being a longitudinal offset, indicator 1 being a transport block size (TBS) indicated by $I_{SF}$ and $I_{TBS}$ in the DCI, and indicator 2 being a TBS of a newly transmitted TB, or indicator 2 being a TBS of a retransmitted TB.

15. The device as claimed in claim 12, wherein the determination module comprises:

a first determination unit, configured to determine $I_{SF}$ and $I_{TBS}$ corresponding to indicator 2 according to an index $I_{SF}$ of the resource allocation amount or an indicator value $I_{TBS}$ of the MCS field of indicator 1;

wherein indicator 1 is a TBS indicated by $I_{SF}$ and $I_{TBS}$ in the DCI, and the indicator 2 is a TBS of a newly transmitted TB, or the indicator 2 is a TBS of a retransmitted TB;

or the determination module comprises:

a second determination unit, configured to classify, in the case that the one DCI schedules N TBs, the N TBs into a first type of TBs and a second type of TBs, N being an even number larger than 2; indicate classification information of the N TBs through one of 1 to $$\text{ceil}(\log_2^{N/2+1})$$

bit offset value indicator information; and determine $I_{SF}$ and $I_{TBS}$ corresponding to indicator 2 according to an index $I_{SF}$ of the resource allocation amount in the resource assignment field or an indicator value $I_{TBS}$ of the MCS field of indicator 1, indicator 1 being TBS of the first type of TBs indicated by the $I_{SF}$ and $I_{TBS}$ in the resource assignment field of the DCI, and indicator 2 being TBS of the second type of TBs indicated by the $I_{SF}$ and $I_{TBS}$ in the resource assignment field of the DCI.

16. The device as claimed in claim 15, wherein the first determination unit is further configured as follows:

under a conditions that the one DCI schedules two TBs, the indicator values $I_{TBS}$ of the MCS fields of the two TBs are identical, and the two TBs are both newly transmitted or retransmitted, indicator 2=indicator 1+transverse position offset β;

or indicator 2=an integer from rounding [indicator 1*transverse position offset β], wherein β is determined according to $I_{TBS}$ and $I_{SF}$ of indicator 1, or according to $I_{TBS}$ and the resource allocation amount $N_{SF}$ of indicator 1.

17. The device as claimed in claim 15, wherein the first determination unit is further configured as follows:

in a case that the one DCI schedules two TBs and the NDI information corresponding to the two TBs is different,

[$I_{SF2}I_{TBS2}$]=[$I_{SF1}I_{TBS1}$]+[βα], or

[$I_{SF2}I_{TBS2}$]=an integer from rounding [$I_{SF1}$*β$I_{TBS1}$*α]

wherein β is a transverse position offset, α is a longitudinal position offset, α and β are determined according to $I_{TBS}$ and $I_{SF}$ of indicator 1, or $I_{TBS}$ and the resource allocation amount $N_{SF}$ of indicator 1,

[$I_{SF2}$ $I_{TBS2}$] represents a resource assignment field indicator value and an MCS field indicator value of indicator 2, and [$I_{SF1}$ $I_{TBS1}$] represents a resource assignment field indicator value and an MCS field indicator value of indicator 1.

18. The device as claimed in claim 12, wherein the determination module comprises:

a third indicator unit, configured to, in a case that the one DCI schedules N TBs, and the N TBs are divided into a first type of TBs and a second type of TBs, N being an even number larger than 2, indicate classification information of the N TBs through k bits, a value range of k being $$[1, \text{ceil}(\log_2^{N/2+1})];$$

and in a case that indicator values $I_{TBS}$ of MCS fields of the N TBs are identical and the first type of TBs and the second type of TBs are both newly transmitted or retransmitted, indicate an index $I_{SF}$ of the resource allocation amount in a resource assignment field of the second type of TBs through a 3-bit offset value indicator information, or, indicate $I_{SF}$ in a resource assignment field of the second type of TBs by a 1-bit or 2-bit offset value indicator information, wherein indicator 2=indicator 1+transverse position offset β, or, indicate $I_{SF}$ in a resource assignment field of the second type of TBs by a 1-bit offset value indicator information, wherein indicator 2=an integer from rounding [indicator 1*transverse position offset β];

wherein indicator 1 being TBS of the first type of TBs indicated by the $I_{SF}$ and $I_{TBS}$ in the resource assignment field of the DCI, and indicator 2 being TBS of the second type of TBs indicated by the $I_{SF}$ and $I_{TBS}$ in the resource assignment field of the DCI;

or the determination module comprises:

a fourth indicator unit, configured to, in a case that the one DCI schedules N TBs, and the N TBs are divided into a first type of TBs and a second type of TBs, N being an even number larger than 2, indicate classification information of the N TBs through one of 1 to $$\text{ceil}(\log_2^{N/2+1})$$

bit offset value indicator information; and in the case that the N TBs are transmitted in a manner of hybrid new transmission and retransmission, and indicate, in a case that indexes $I_{SF}$ of the resource allocation amount of the first type of TBs and the second type of TB are identical, an indicator value $I_{TBS}$ of an MCS field of the second type of TBs through a 4-bit offset value indicator information; and indicate, in a case that both $I_{SF}$ and $I_{TBS}$ of the first type of TBs and the second type of TBs are different, transverse position offset β and longitudinal position offset corresponding to the $I_{SF}$ and $I_{TBS}$ of the second type of TBs through a 3-bit offset value indicator information, wherein $[I_{SF2}\ I_{TBS2}]=[I_{SF1}\ I_{TBS1}]+[\beta\ \alpha]$, or, indicate the transverse position offset β and longitudinal position offset corresponding to the $I_{SF}$ and $I_{TBS}$ of the second type of TBs through a 2-bit offset value indicator information, wherein $[I_{SF2}\ I_{TBS2}]$=an integer from rounding $[I_{SF1}*\beta\ I_{TBS1}*\alpha]$;

wherein $[I_{SF2}\ I_{TBS2}]$ represents a resource assignment field indicator value and an MCS field indicator value of indicator 2, and $[I_{SF1}\ I_{TBS1}]$ represents a resource assignment field indicator value and an MCS field indicator value of indicator 1, indicator 1 being TBS of the first type of TBs indicated by the $I_{SF}$ in the resource assignment field and $I_{TBS}$ in the DCI, and indicator 2 being TBS of the second type of TBs indicated by the $I_{SF}$ in the resource assignment field and $I_{TBS}$ in the DCI.

* * * * *